(12) United States Patent
Yang

(10) Patent No.: US 12,498,567 B2
(45) Date of Patent: Dec. 16, 2025

(54) PLASTIC REFLECTIVE WAVEGUIDE MANUFACTURING

(71) Applicant: Microsoft Technology Licensing, LLC, Redmond, WA (US)

(72) Inventor: Long Yang, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

(21) Appl. No.: 18/312,322

(22) Filed: May 4, 2023

(65) Prior Publication Data

US 2024/0369831 A1 Nov. 7, 2024

(51) Int. Cl.
  *G02B 27/01* (2006.01)
  *B29C 45/14* (2006.01)
  (Continued)

(52) U.S. Cl.
  CPC .... *G02B 27/0101* (2013.01); *B29C 45/14336* (2013.01); *B29C 45/14811* (2013.01);
  (Continued)

(58) Field of Classification Search
  CPC ............... G02B 27/0101; G02B 6/13; B29C 45/14336; B29C 45/14811; B29C 45/1679; B29D 11/00692; B29D 11/00875
  See application file for complete search history.

(56) References Cited

U.S. PATENT DOCUMENTS

| | | |
|---|---|---|
| 11,137,603 B2 | 10/2021 | Zhang |
| 2012/0301074 A1 | 11/2012 | Spitzer |

(Continued)

FOREIGN PATENT DOCUMENTS

| | | |
|---|---|---|
| CN | 111812773 A | 10/2020 |
| CN | 114851608 A | 8/2022 |
| JP | 2004188822 A | 7/2004 |

OTHER PUBLICATIONS

"Manufacturing", Retrieved From: https://lumusvision.com/manufacturing/, Retrieved Date: Nov. 24, 2022, 5 Pages.

(Continued)

*Primary Examiner* — James A Dudek
(74) *Attorney, Agent, or Firm* — Michael T. Abramson; Jordan IP Law, LLC

(57) ABSTRACT

A plastic reflective waveguide is manufactured using a soft transfer stamp formed in a first mold using a liquid injection molding process to provide the stamp with parallel wall surfaces having a zero degree draft angle. The soft transfer stamp is placed as an insert in a second mold utilized in a multi-stage thermoplastic injection molding process. A first thermoplastic injection molding stage molds a base part of the plastic reflective waveguide having parallel wall surfaces with a zero degree draft angle. The soft transfer stamp is removed from the second mold and a partially-reflective coating is applied to the base part. A second thermoplastic injection molding stage is utilized to create a secondary part of the plastic reflective waveguide. The raw plastic reflective waveguide is ejected from the second mold and subjected to additional manufacturing processes to realize a finished part meeting design requirements for size and form factor.

18 Claims, 21 Drawing Sheets

(51) Int. Cl.
  *B29C 45/16* (2006.01)
  *B29D 11/00* (2006.01)
  *G02B 6/13* (2006.01)
  *B29C 45/00* (2006.01)
  *G02B 6/12* (2006.01)

(52) U.S. Cl.
  CPC .... *B29C 45/1679* (2013.01); *B29D 11/00692* (2013.01); *B29D 11/00875* (2013.01); *G02B 6/13* (2013.01); *B29C 2045/0058* (2013.01); *B29C 2045/1678* (2013.01); *G02B 2006/12166* (2013.01)

(56) References Cited

U.S. PATENT DOCUMENTS

| | | | |
|---|---|---|---|
| 2018/0372923 A1* | 12/2018 | Wijaya | G02B 3/005 |
| 2019/0227316 A1 | 7/2019 | Lee | |
| 2022/0326427 A1 | 10/2022 | Thomae | |
| 2022/0334302 A1 | 10/2022 | Zhang | |

OTHER PUBLICATIONS

Bruck, et al., "Direct Replication of Nanostructures From Silicon Wafers in Polymethylpentene by Injection Molding", In Proceedings of vol. 7788, Polymer Optics Design, Fabrication, and Materials, Aug. 12, 2010, 8 Pages.

Cheng, et al., "Design and Manufacture AR Head-Mounted Displays: A Review and Outlook", In Journal of Light: Advanced Manufacturing, vol. 2, Issue 24, Sep. 26, 2021, pp. 1-20.

Giboz, et al., "Microinjection Molding of Thermoplastic Polymers: A Review", In Journal of Micromechanics and Microengineering, vol. 17, No. 6, May 15, 2007, 14 Pages.

Hou, et al., "Geometrical Waveguide in See-Through Head-Mounted Display: A Review", In Proceedings of vol. 10021, Optical Design and Testing VII, Oct. 31, 2016, 8 Pages.

International Search Report and Written Opinion received for PCT Application No. PCT/US2024/025303, Jul. 26, 2024, 13 pages.

* cited by examiner

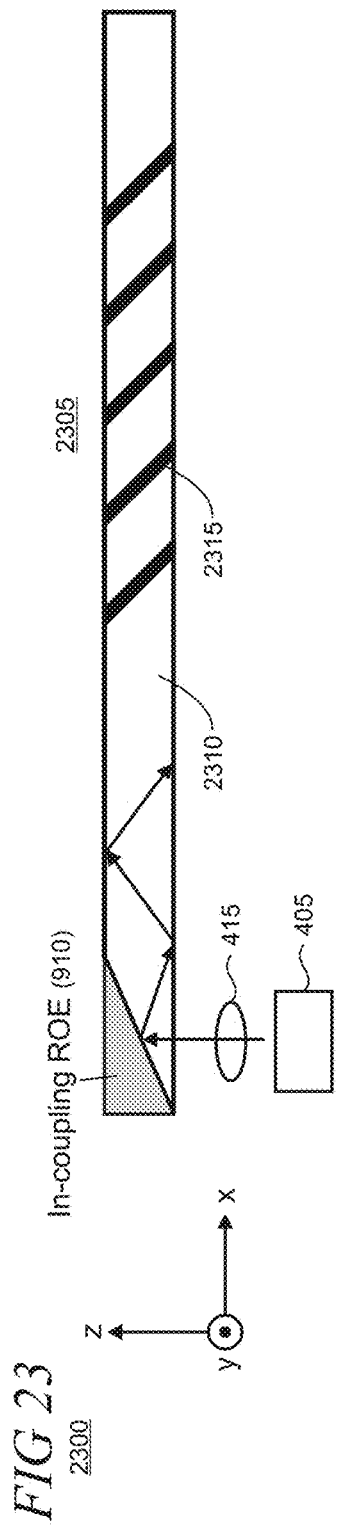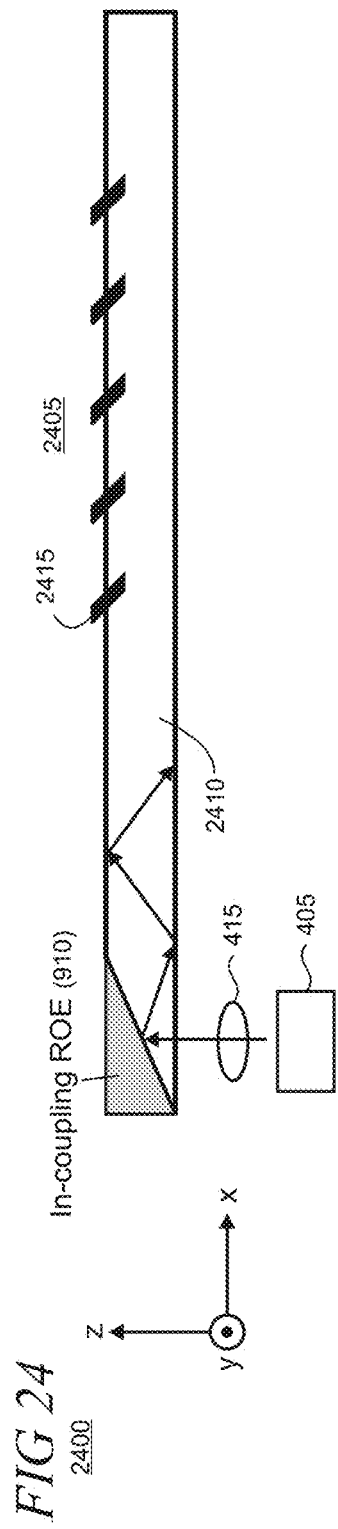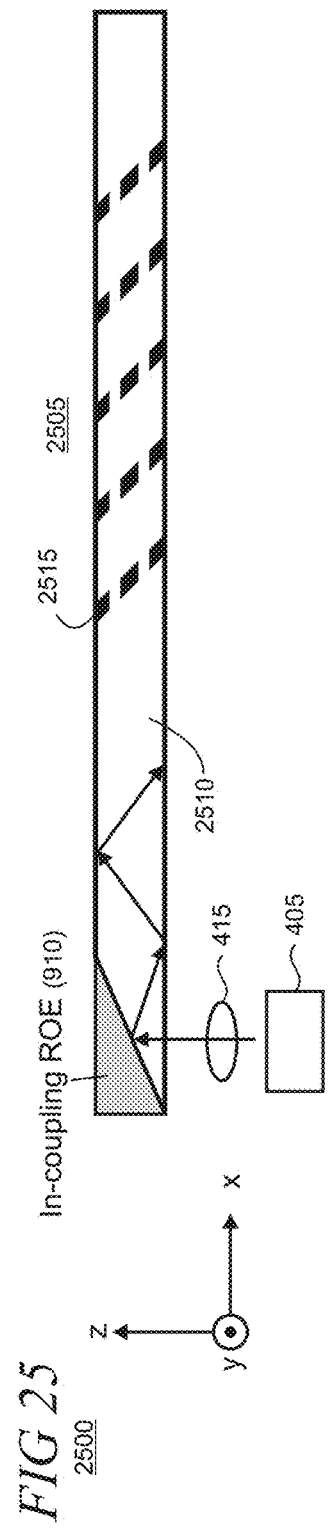

2600

2700

2800

PLASTIC REFLECTIVE WAVEGUIDE MANUFACTURING

BACKGROUND

Mixed-reality computing devices, such as head-mounted display (HMD) devices and handheld mobile devices (e.g., smart phones, tablet computers, etc.), are typically configurable to display information to a user about virtual images, and/or images of real objects in a field of view (FOV) of the user. For example, some HMD devices are configured to display, using a see-through display system, virtual environments with real-world objects mixed in, or real-world environments with virtual objects mixed in.

SUMMARY

Disclosed are a plastic reflective waveguide apparatus and associated methods of manufacturing that include a cascaded array of parallel partially-mirrored elements embedded in a plastic waveguide. Use of a soft transfer stamp supports a zero degree draft angle in injection-molded parts which enables fabrication of parallel partial mirrors. A multi-stage injection molding process is utilized including a first stage of soft transfer stamp molding from thermosetting material that provides for separation of the cured but flexible stamp from a mold having a zero degree draft angle. The second stage uses the soft transfer stamp as an insert to mold half of the waveguide (a base part) from optical grade thermoplastic. The base part is coated with a half-mirror coating. The third stage molds the second part of the waveguide (a secondary part) from optical grade thermoplastic around the half-mirror-coated base part.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIGS. 23-28 show top views of various illustrative embodiments of a waveguide plate having an ROE that uses a concatenated array of mirror elements embedded in a waveguide having planar or curved configurations;

Like reference numerals indicate like elements in the drawings. Elements are not drawn to scale.

DETAILED DESCRIPTION

A plastic reflective waveguide usable as a reflective optical element (ROE) in display systems of mixed-reality HMD devices is manufactured using a soft transfer stamp having parallel wall surfaces molded with a liquid thermosetting elastomer that is injected into a first mold. The use of an elastomeric material, such as silicon, enables the soft transfer stamp to be removed from the mold, once cured, without requiring maintenance of a draft angle in the mold that would otherwise be needed to facilitate removal of rigid molded parts.

The soft transfer stamp is used as an insert in the first stage of an injection molding process using optical grade thermoplastic to mold a base part of the plastic reflective waveguide having parallel walls with a zero degree draft angle. After the base part cools and solidifies, the soft transfer stamp is disengaged from the base part and removed from the mold, and surfaces of the base part are coated with a partially-reflective coating. The second stage of the injection molding process molds a secondary part from optical grade thermoplastic around the base part. Subsequent manufacturing processes such as cutting, trimming, grinding, and/or polishing are then utilized to create a finished plastic reflective waveguide.

Utilization of the soft transfer stamp enables manufacturing of the plastic reflective waveguide while maintaining sufficient parallelism of the partially-mirrored surfaces to implement a cascaded array of mirror elements. In illustrative embodiments, the cascaded mirror elements are embedded, partially embedded, or utilize a fractured configuration within a waveguide substrate formed by the molded optical grade thermoplastic. The disclosed injection molding processes using a soft transfer stamp are adaptable to produce a variety of shapes and form factors for plastic reflective waveguides including planar, curved, and combinations thereof. The present plastic reflective waveguide uses materials and processes that are less costly compared to conventional ROE designs that use stacked coated glass plates. In addition, the plastic reflective waveguides weigh less and are more resistant to damage from HMD device user handling and environmental conditions compared to conventional glass embodiments.

Figure 1:
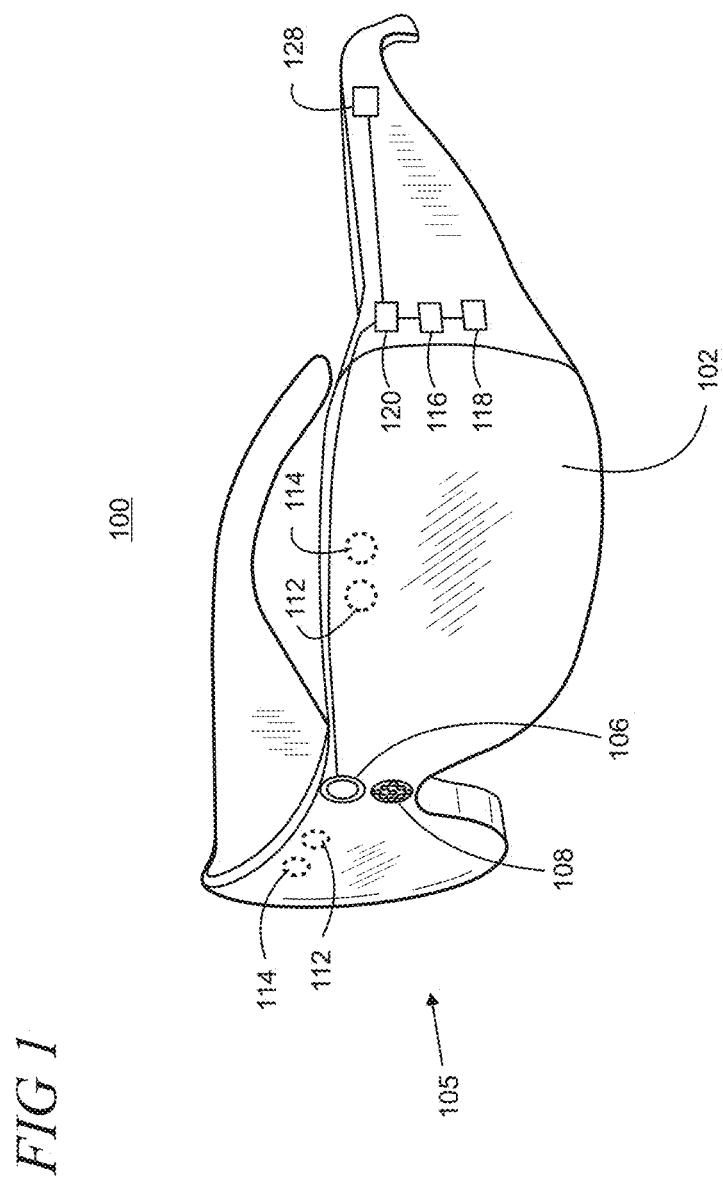
FIG. 1 is a pictorial view of an illustrative example of a mixed-reality head-mounted display (HMD) device.
Figure 2:
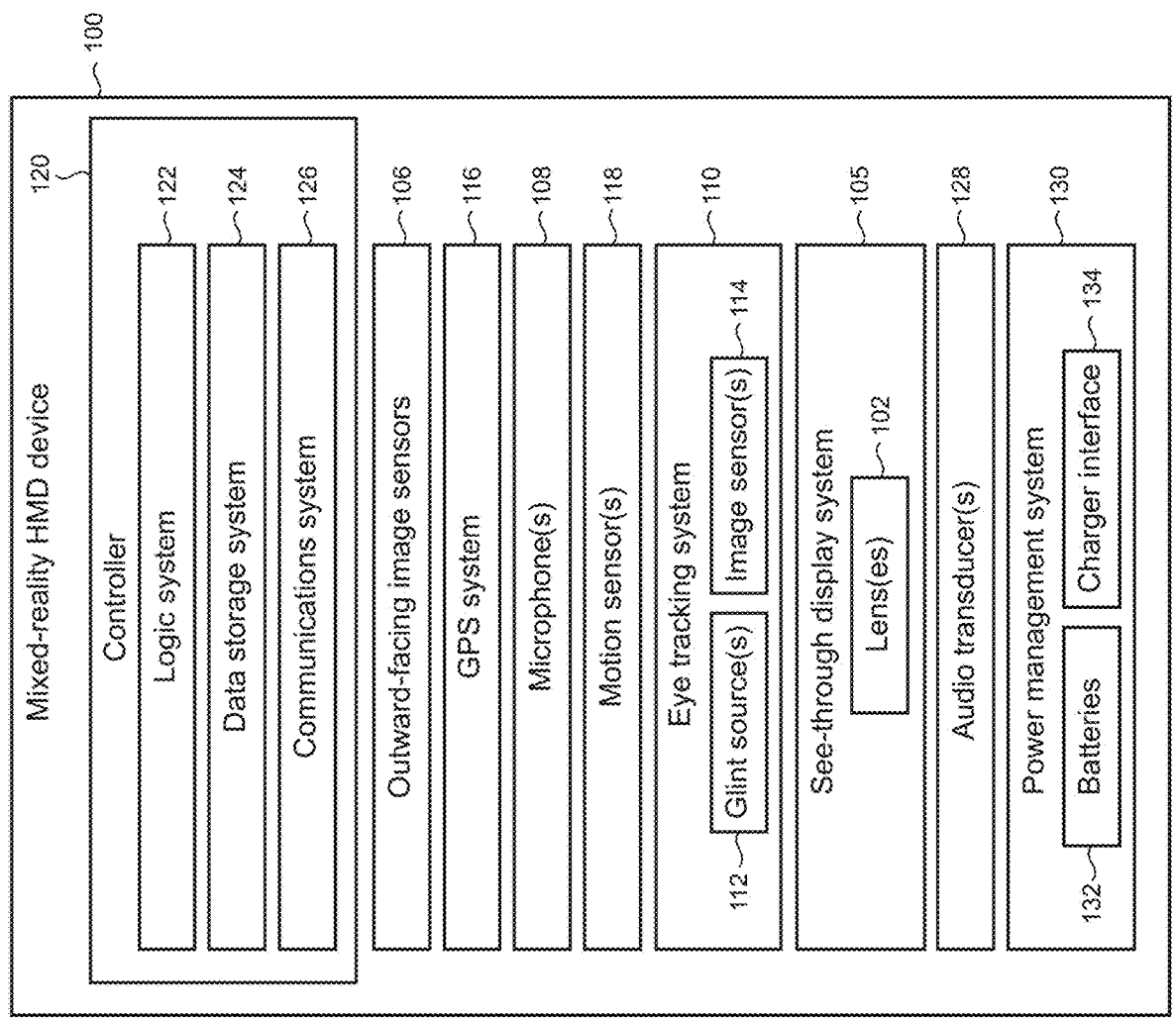
FIG. 2 shows a block diagram of an illustrative example of a mixed-reality HMD device.

Turning now to the drawings, FIG. 1 shows an illustrative example of a mixed-reality HMD device 100 that utilizes a see-through display system 105, and FIG. 2 shows a functional block diagram of the HMD device. The HMD device comprises one or more lenses 102 that form a part of the see-through display system 105. Virtual images are displayed using the lenses which incorporate one or more waveguide-based display systems, such as a near-eye display system. The HMD device further comprises one or more outward-facing image sensors 106 configured to acquire images of a background scene and/or a physical environment being viewed by a user and typically includes one or more microphones 108 configured to detect sounds, such as voice commands from a user. Outward-facing image sensors 106 typically include one or more depth sensors and/or one or more two-dimensional image sensors.

The HMD device 100 may further include an eye-tracking system 110 configured for detecting a direction of gaze of each eye of a user (not shown) or a direction or location of focus. The eye-tracking system can optically include a body tracking system such as a hand tracker, or the body tracking system can be separately instantiated. The eye-tracking system is configurable to determine gaze directions of each of a user's eyes in any suitable manner. For example, in the illustrative example shown, the eye-tracking system includes one or more glint sources 112, such as infrared light sources, that are configured to cause a glint of light to reflect from each eyeball of a user, and one or more image sensors 114, such as inward-facing sensors, that are configured to capture an image of each eyeball of the user. Changes in the glints from the user's eyeballs and/or a location of a user's pupil, as determined from image data gathered using the image sensors 114, are used to determine a direction of gaze.

In addition, a location at which gaze lines projected from the user's eyes intersect the external display may be used to determine an object at which the user is gazing (e.g., a displayed virtual object and/or real background object). The eye-tracking system 110 includes any suitable number and arrangement of light sources and image sensors. In some implementations, the eye-tracking system is omitted from the HMD device.

The HMD device 100 generally also includes additional sensors. For example, the HMD device comprises a global positioning system (GPS) system 116 to allow a location of the HMD device to be determined. This may help to identify real-world objects, such as buildings, etc., that are located in the user's adjoining physical environment.

The HMD device 100 typically includes one or more motion sensors 118 (e.g., inertial, multi-axis gyroscopic, or acceleration sensors) to detect movement and position/orientation/pose of a user's head when the user is wearing the system as part of a mixed-reality or virtual-reality HMD device. Motion data is usable, potentially along with eye-tracking glint data and outward-facing image data, for gaze detection and eye and/or body tracking, as well as for image stabilization to help correct for blur in images from the outward-facing image sensors 106. The use of motion data generally allows for changes in gaze direction to be tracked even if image data from outward-facing image sensors cannot be resolved.

In addition, motion sensors 118, as well as the microphones 108 and eye-tracking system 110 (and/or an optional body tracking system), also are employed as user input devices in some cases, such that a user may interact with the HMD device 100 via gestures of the eye, neck, head and/or fingers/hands, as well as via verbal commands in some cases. It may be understood that the sensors illustrated in FIGS. 1 and 2 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 100 further includes a controller 120 such as one or more processors having a logic system 122 and a data storage system 124 in communication with the sensors, eye-tracking system 110, display system 105, and/or other components through a communications system 126. The communications system 126 can also facilitate the display system 105 being operated in conjunction with remotely located resources, such as processing, storage, power, data, and services. That is, in some implementations, an HMD device can be operated as part of a system that can distribute resources and capabilities among different components and systems.

The storage system 124 includes instructions stored thereon that are executable by logic system 122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 100 is configured with one or more audio transducers 128 (e.g., speakers, earphones, etc.) so that audio can be utilized as part of a mixed-reality or virtual-reality experience. A power management system 130 may include one or more batteries 132 and/or protection circuit modules (PCMs) and an associated charger interface 134 and/or remote power interface for supplying power to components in the HMD device 100.

It may be appreciated that the HMD device 100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

The display system 105 is arranged in some implementations as a near-eye display. In a near-eye display, the display engine or imaging device does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

Figure 3:
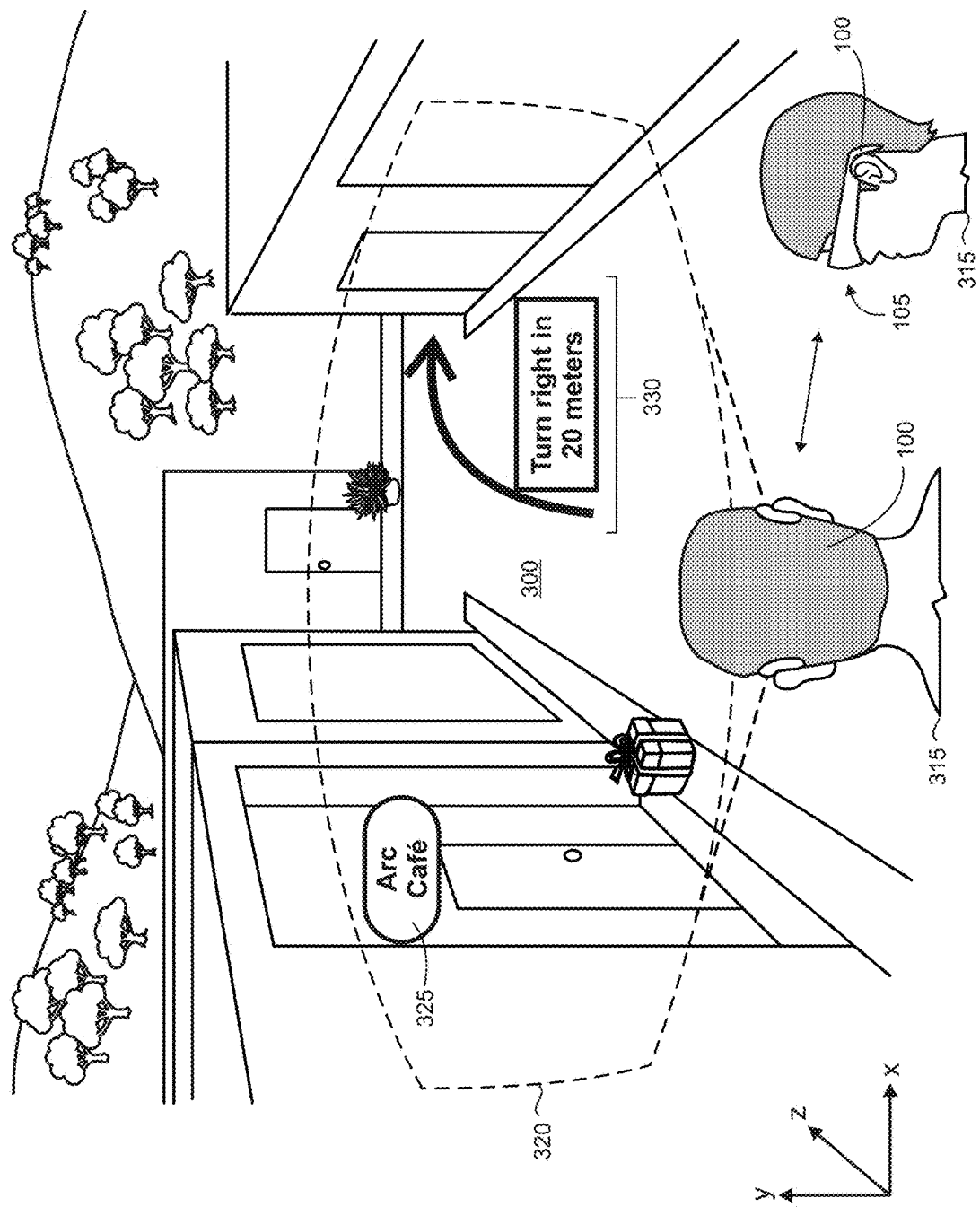
FIG. 3 illustratively shows virtual images that are overlayed onto real-world images within a field of view (FOV) of a mixed-reality HMD device.

FIG. 3 shows the HMD device 100 worn by a user 315 as configured for mixed-reality experiences in which the display system 105 is implemented as a near-eye display system having at least a partially transparent, see-through waveguide, among various other components. As noted above, a suitable display engine (not shown) generates virtual images that are guided by the waveguide in the display system to the user. Being see-through, the waveguide in the display system enables the user to perceive light from the real world.

The see-through waveguide-based display system 105 can render images of various virtual objects that are superimposed over the real-world images that are collectively viewed using the see-through waveguide display to thereby create a mixed-reality environment 300 within the HMD device's FOV (field of view) 320. It is noted that the FOV of the real world and the FOV of the images in the virtual world are not necessarily identical, as the virtual FOV provided by the display system is typically a subset of the real FOV. FOV is typically described as an angular range in horizontal, vertical, or diagonal dimensions over which virtual images can be projected.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

In the illustrative example shown in FIG. 3, the user 315 is physically walking in a real-world urban area that includes city streets with various buildings, stores, etc., with a countryside in the distance. The FOV 320 of the cityscape viewed on HMD device 100 changes as the user moves through the real-world environment and the device can render static and/or dynamic virtual images over the real-world view. In this illustrative example, the virtual images include a tag 325 that identifies a restaurant business and directions 330 to a place of interest in the city. The mixed-reality environment 300 seen visually on the display system 105 may also be supplemented by audio and/or tactile/haptic sensations produced by the HMD device in some implementations.

Figure 4:
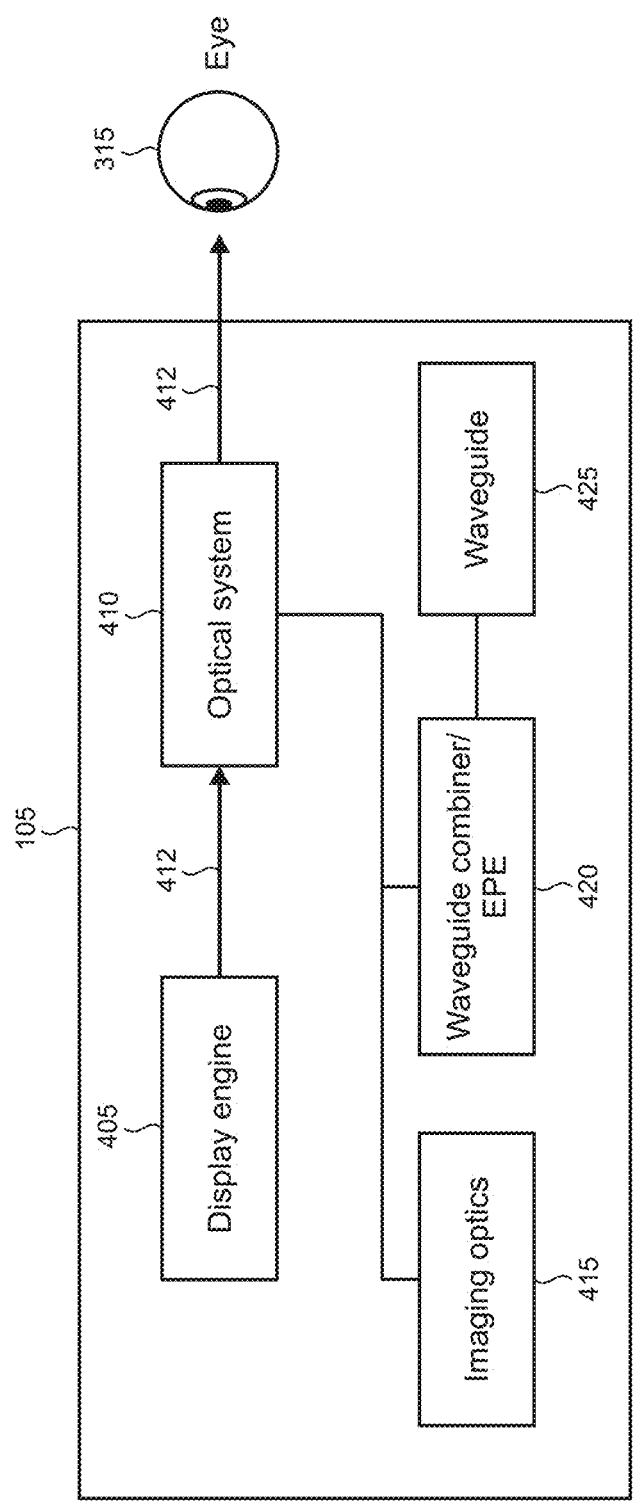
FIG. 4 shows illustrative components of a display system that may be utilized in an HMD device.

FIG. 4 shows illustrative components of the display system 105 utilized in the HMD device 100 in an illustrative mixed-reality embodiment. The display system includes a display engine 405 and an optical system 410 to provide virtual images and views of the real world to the user 315 over a light path 412. The optical system includes imaging optics 415 to support an optical interface between the light engine and a waveguide combiner 420 which, in this example, includes an exit pupil expander (EPE) functionality. The imaging optics typically include optical elements such as lenses, mirrors, filters, gratings, and the like, and may further include electromechanical elements such as MEMS devices in scanning-type light engine implementations.

A waveguide 425 facilitates light transmission between the display engine 405 and the user's eye 315 over the light path 412. One or more waveguides can be utilized in the display system 105 because they are transparent (or partially transparent in some implementations) and because they are generally small and lightweight (which is desirable for HMD devices where size and weight are generally sought to be minimized for reasons of performance and user comfort). For example, the waveguide can enable the display engine to be located out of the way, for example, on the side of the user's head or near the forehead, leaving only a relatively small, light, and transparent waveguide optical element in front of the eyes.

Figure 5:
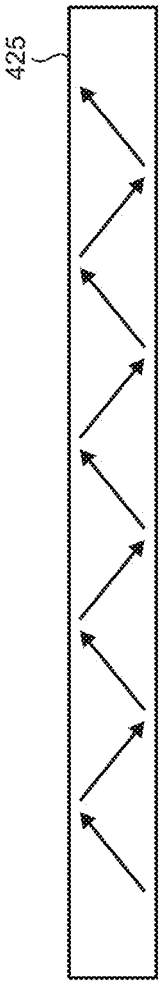
FIG. 5 shows propagation of light in a waveguide by total internal reflection (TIR)

In an illustrative implementation, the waveguide 425 operates using a principle of total internal reflection (TIR), as shown in FIG. 5, so that light can be coupled among the various optical elements in the display system 105. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

As discussed in more detail below, the waveguide 425 is configured to include holographic optical elements (HOEs) having, for example, diffraction gratings, mirror structures and/or other reflective and/or partially reflective surfaces to guide light propagation over the light path 412 in the waveguide combiner 420 within a defined spatial region within the waveguide.

Figure 6:
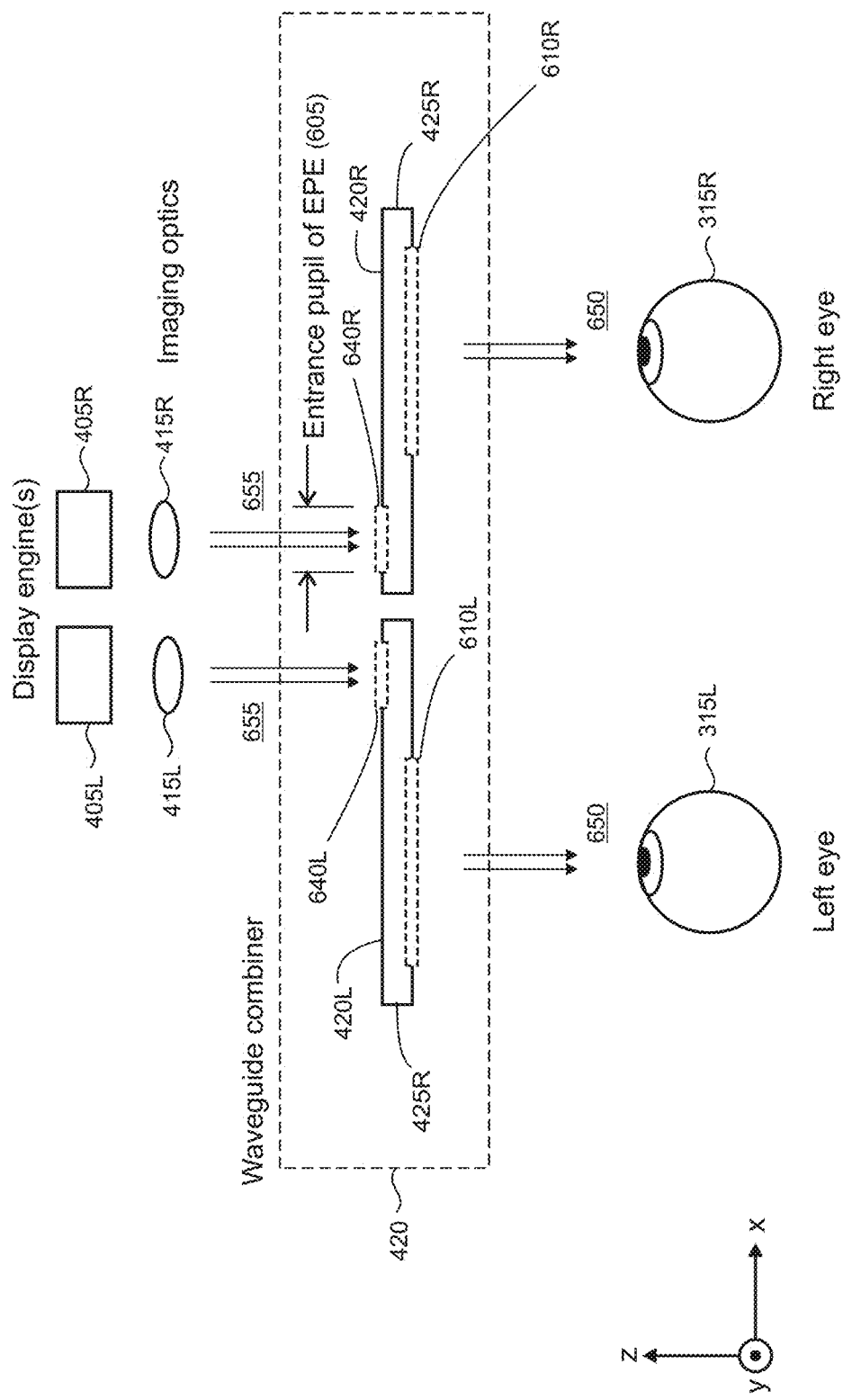
FIG. 6 shows a top view of an illustrative waveguide combiner that includes an exit pupil expander.

FIG. 6 shows a top view of an illustrative waveguide combiner 420 that uses separate left and right combiners (420L and 420R), each associated with a respective display engine (405L and 405R) and imaging optics (415L and 415R) to generate, for example, stereo virtual images for the user 315. Each waveguide includes EPE functionality and receives one or more input optical beams from a respective display engine as an entrance pupil 605 for virtual image light to produce one or more output optical beams with expanded exit pupil in one or two directions relative to the input. The expanded exit pupil typically facilitates a virtual display to be sufficiently sized to meet the various design requirements, such as eyebox size, image resolution, FOV, and the like, of a given optical system while enabling the imager and associated components to be relatively light and compact.

The waveguide combiner 420 utilizes two output couplers, 610L and 610R that are supported on the waveguides 425L and 425R and two input couplers 640L and 640R. The input and output couplers are configurable as HOEs including one of DOE, ROE, or a combination. One or more intermediate HOEs (not shown in FIG. 6) are disposed on the left and right waveguides in a stacked plate configuration, as described below. The HOEs are generally arrangeable in various configurations on the waveguides, for example, on the same side or different sides of the waveguides and may further be single- or double-sided in some implementations. While the waveguide combiner is depicted as having a planar configuration, other shapes may also be utilized including, for example, curved or partially spherical shapes, in which case, mirror structures in the HOEs disposed thereon may be non-co-planar.

Exemplary output beams 650 from the waveguide combiner 420 are parallel to the exemplary input beams 655 that are output from the display engines 405 to the input couplers 640. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images overlap with different focal depths in an optical phenomenon known as focus spread.

Figure 7:
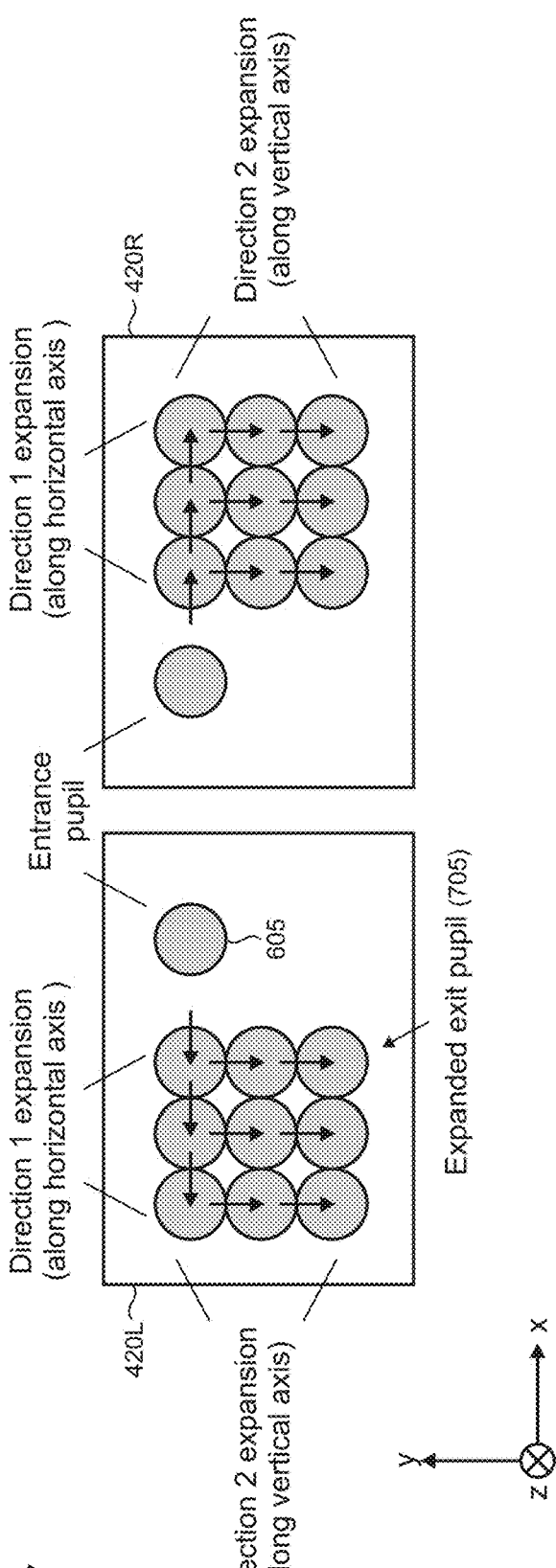
FIG. 7 shows a front view of an illustrative waveguide combiner with an exit pupil expander in which the exit pupil is expanded along two directions of the field of view (FOV) via pupil replication.

As shown in FIG. 7, the waveguide combiner 420 is configured to provide an expanded exit pupil 705 in two directions (i.e., along each of a first and second coordinate axis) compared with the entrance pupil 605 at the input couplers (not shown in FIG. 7) of the waveguide combiner 420. As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display system is upright and forward facing, but less intuitive for other usage scenarios. The listed terms are not to be construed to limit the scope of the configurations (and usage scenarios therein) of near-eye display features utilized in the present arrangement.

Figure 8:
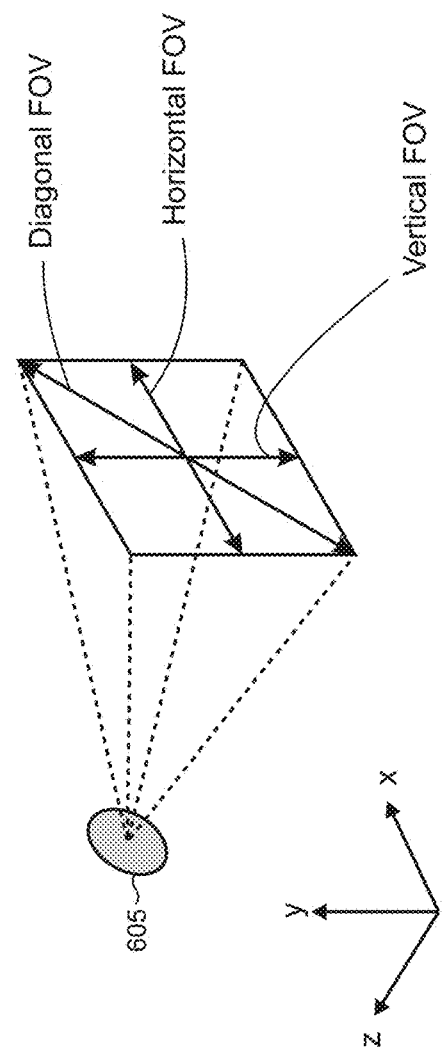
FIG. 8 shows an illustrative input to an exit pupil expander in which the FOV is described by angles in horizontal, vertical, or diagonal orientations.

The entrance pupil to the waveguide combiner at the input couplers 640 is generally described in terms of FOV, for example, using horizontal FOV, vertical FOV, or diagonal FOV as shown in FIG. 8.

Figure 9:
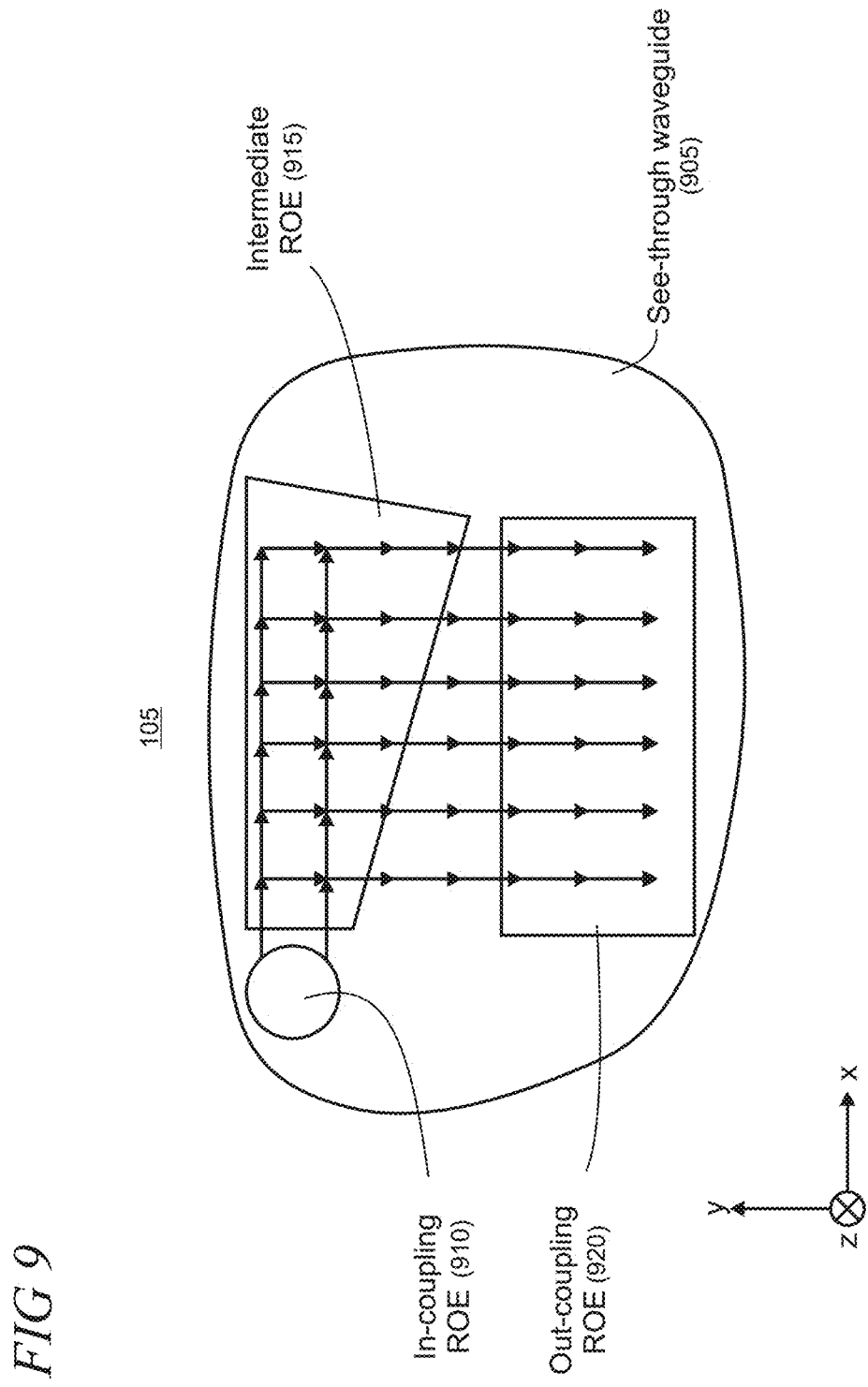
FIG. 9 is a pictorial view of an illustrative arrangement of reflective optical elements (ROEs) in an HMD device that are configured for in-coupling, exit pupil expansion in two directions, and out-coupling.

FIG. 9 is a pictorial view of an illustrative arrangement of ROEs in one of the waveguides 905 in the display system 105 of an HMD device that are configured for in-coupling, exit pupil expansion in two directions, and out-coupling via virtual image light propagation paths, as shown. The in-coupling ROE 910, implementable, for example, as a prism, receives virtual images from a display engine (not shown) and couples them to the intermediate ROE 915 which horizontally expands the exit pupil and couples the virtual image light downwards (i.e., in the negative y direction) to the out-coupling ROE 920. The out-coupling ROE vertically expands the exit pupil and out-couples the virtual image light to a user's eye (not shown) with an exit pupil that is expanded in two directions compared to an entrance pupil at the in-coupling ROE.

Figure 10:
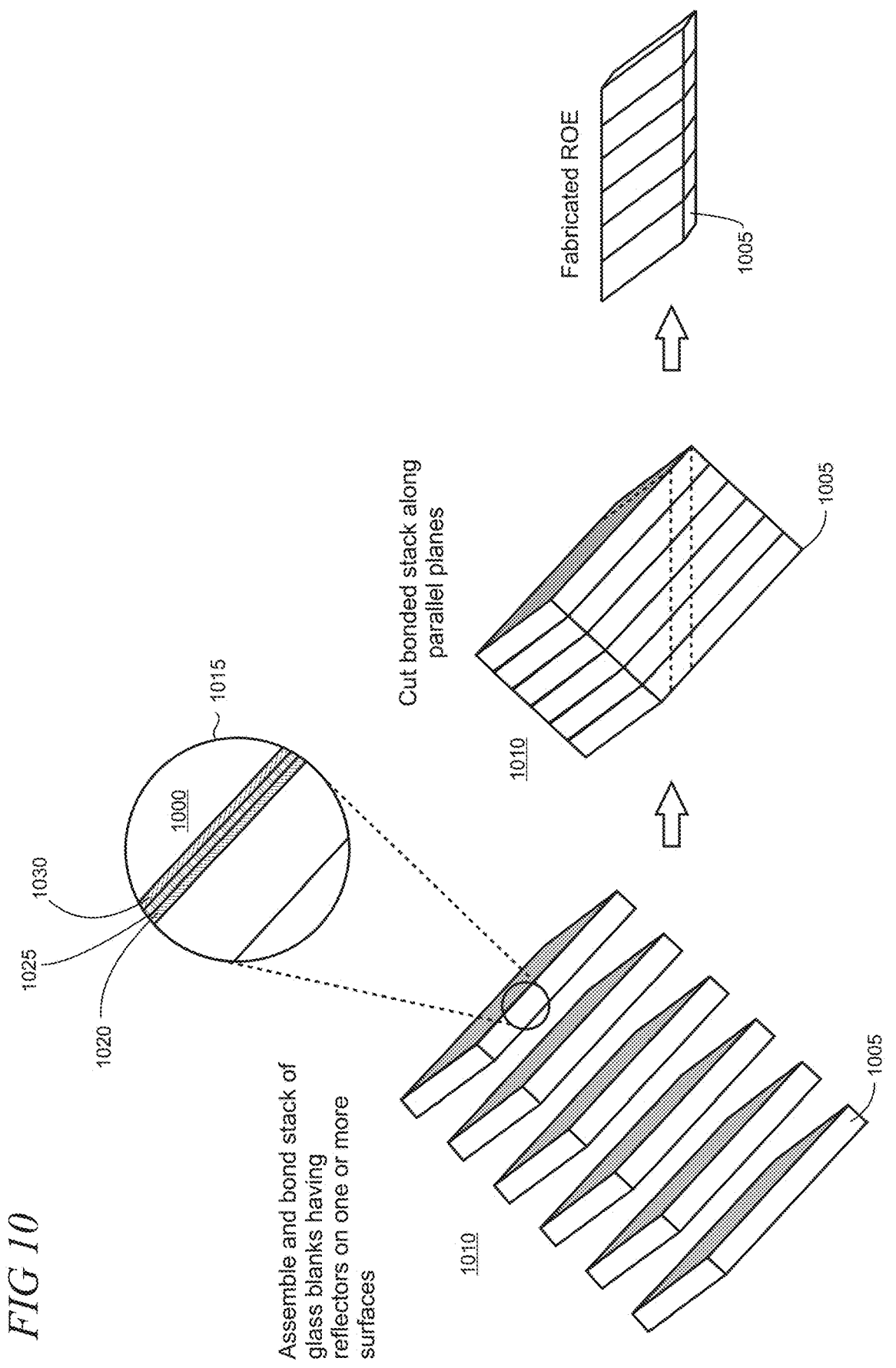
FIG. 10 shows illustrative fabrication techniques for an ROE using stacked glass blanks that have one or more layers of thin film deposited on one or more surfaces.

FIG. 10 shows illustrative conventional fabrication techniques for an ROE using stacked glass blanks that have one or more layers of thin film deposited on one or more surfaces. A glass sheet is cut to form uniformly sized and shaped blanks. The sheet is provided with reflectors, such as thin film coatings, prior to cutting, or the blanks may be individually provided with reflectors or coatings after cutting. The blanks, representatively indicated by reference numeral 1005, are assembled into a stack 1010 using a bonding agent on the major planar surfaces and/or around the peripheral edges. It will be appreciated that the number of blanks in the stack determines the number of cascaded mirror elements in an array. Cutting, grinding, and/or polishing steps can optionally be utilized during the fabrication and assembly of the blanks, stack, or ROE.

The stack 1010 is cut along parallel planes at an oblique angle with respect to the stack axis that is suitable to implement a desired amount of tilt in the mirror elements in a finished ROE. In this illustrative example, as shown in the enlarged view 1015, the top planar surface of each blank is coated with a thin-film coating 1000 comprising single or multiple layers of dielectric materials in which the coating composition and thickness is selected to provide the desired reflectance characteristics over the FOV of interest. For example, the dielectric materials may each be different, as indicated in the enlarged view by reference numerals 1020, 1025, and 1030, or alternating layers of two or more different materials are usable in some cases. Generally, the dielectric materials have different indices of refraction or other characteristics and may include silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide.

Other exemplary dielectric materials that can be included in the coating 1000 may include, but are not limited to, silicon hydride ($Si_xH_y$), silicon nitride ($Si_xN_y$), silicon oxynitride ($Si_xO_zN_y$), tantalum oxide ($Ta_xO_y$), gallium arsenide (GaAs), and gallium nitride (GaN). It is also possible that one or more layers of the coating may comprise metallic layers that are non-dielectric.

Chemical and/or physical deposition techniques can be used to deposit the materials on a surface of a blank 1005 to form the coating 1000. Exemplary chemical deposition techniques that can be used include, but are not limited to, chemical solution deposition (CSD), spin coating, chemical vapor deposition (CVD), plasma-enhanced chemical film conversion (PECFC), and atomic layer deposition (ALD). Exemplary physical deposition techniques that can be used include, but are not limited to, physical vapor deposition (PVD), molecular beam epitaxy (MBE), sputtering, pulsed laser deposition (PLD), cathodic arc deposition (arc-PVD), and electrohydrodynamic deposition.

It is noted that the number of layers shown in FIG. 10 is intended to be illustrative and that variations from the configuration shown can be expected, as necessary to meet the requirements of a particular implementation. In general, it is desirable to minimize the number of layers to simplify fabrication and reduce costs. Thicker coatings may give rise to stresses in the ROEs that can cause strain in the waveguide combiner that may negatively impact alignment and flatness (with concomitant negative impact on display quality) and reduce reliability. While thicker substrates may be used to reduce the strain and help to maintain alignment and flatness, such configuration may result in more weight being added to the waveguide combiner assembly which is typically undesirable in HMD device applications.

The conventional ROEs using stacked glass plates discussed above generally perform satisfactorily in many applications. The glass plates provide a degree of parallelism among the reflective surfaces to support propagation within the ROE to meet various design objectives. However, the materials and processes utilized to manufacture stacked glass ROEs are typically costly and glass materials may be undesirably heavy and/or susceptible to handling damage in some cases. Weight minimization is typically sought in HMD devices to provide optimal user comfort and user experiences.

Figure 11:
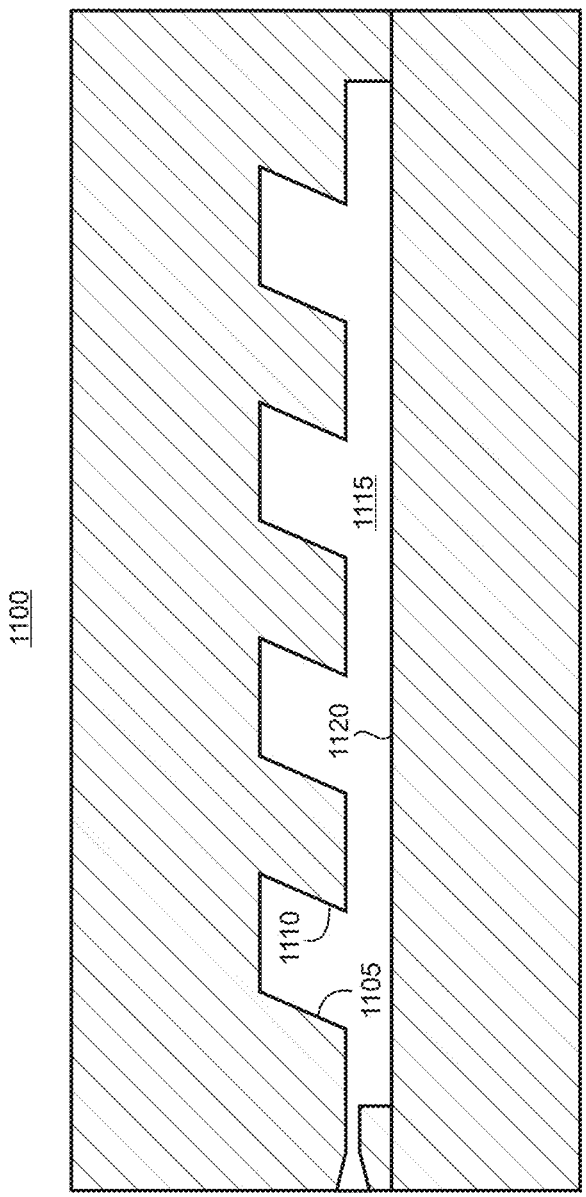
FIG. 11 is a cross-sectional view of an illustrative first injection mold usable in a liquid injection molding (LIM) process as a step in the present manufacturing of a plastic reflective waveguide.

The present reflective waveguide manufacturing utilizes plastic materials and injection molding processes that can provide substantial cost savings compared to stacked glass. A soft transfer stamp provides a zero degree draft angle for injection molded parts to thereby implement parallel mirrored surfaces in a finished plastic reflective waveguide. FIG. 11 provides a cross-sectional view of an illustrative first injection mold 1100 usable in a liquid injection molding (LIM) process to mold the soft transfer stamp as a step in the present manufacturing of a plastic reflective waveguide. A cavity 1115 in the mold is provided with parallel walls, as representatively indicated by reference numerals 1105 and 1110. As shown in this particular illustrative example, the cavity 1115 includes a laterally extending base portion 1120 and the walls 1105 and 1110 are tilted with respect to the base portion. The angle of tilt can vary by application. The use of an elastomeric material such as silicon enables the soft transfer stamp to be removed from the mold without requiring maintenance of a draft angle in the mold that would otherwise be needed to facilitate ejection of rigid molded parts.

Figure 12:
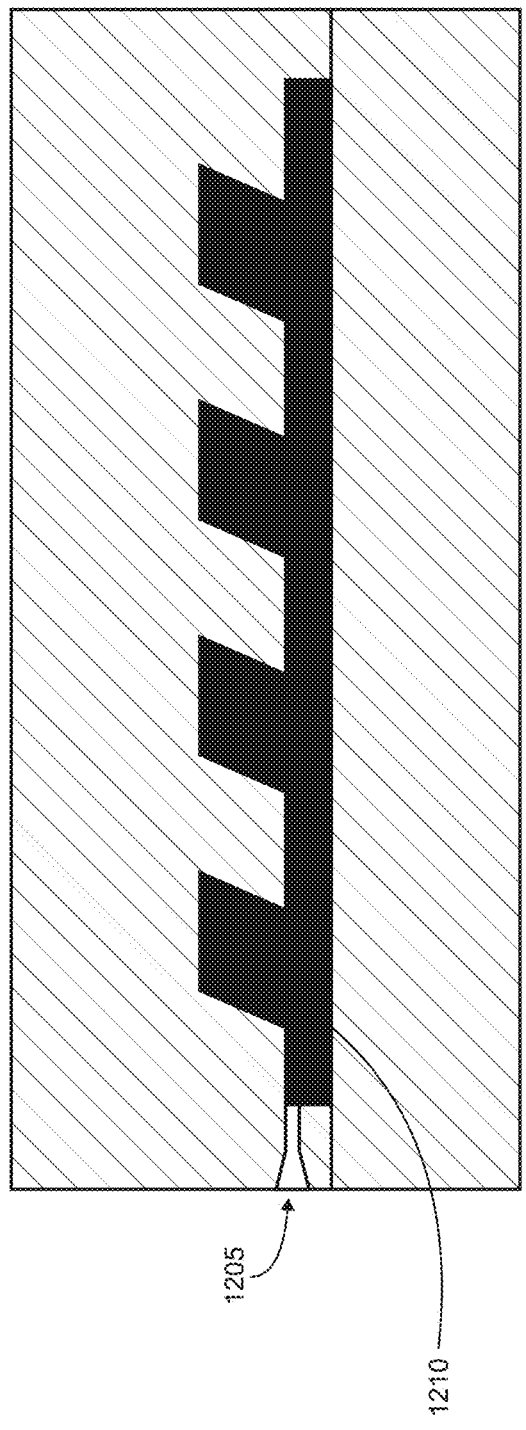
FIG. 12 shows the first injection mold into which a liquid elastomeric material is injected to mold a soft transfer stamp using an LIM process.

FIG. 12 shows the first injection mold 1100 into which a liquid elastomeric material is injected through a gate 1205 to mold a soft transfer stamp 1210 using an LIM process. The liquid elastomeric material typically comprises a thermosetting material, for example silicon, that is mixed from two or more compounds and then heat-cured on the mold. The heat-curing may use a catalyst such as platinum or other suitable materials in some applications. Alternative processes for molding the soft transfer stamp include transfer molding and compression molding.

Figure 13:
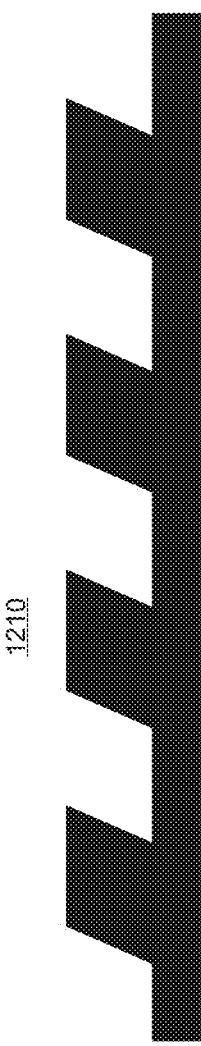
FIG. 13 shows an illustrative soft transfer stamp molded using an LIM process subsequent to being removed from the first injection mold and subjected to secondary manufacturing processes.

FIG. 13 shows the soft transfer stamp 1210 as molded using an LIM process subsequent to being removed or ejected from the first injection mold 1100. The soft transfer stamp can optionally undergo various secondary manufacturing processes such as trimming or other appropriate finishing processes. The finished soft transfer stamp is utilized to mold a base part of a plastic reflective waveguide that is utilizable as an ROE in the display system 105 (FIG. 1), as discussed below. In typical applications, the soft transfer stamp is configured with sufficient durability to be reusable in multiple molding processes. The use of elastomeric material for the soft transfer stamp enables it to be disengaged from the molded base part even though both the stamp and the base part have zero degree draft angle for their respective walls.

Figure 14:
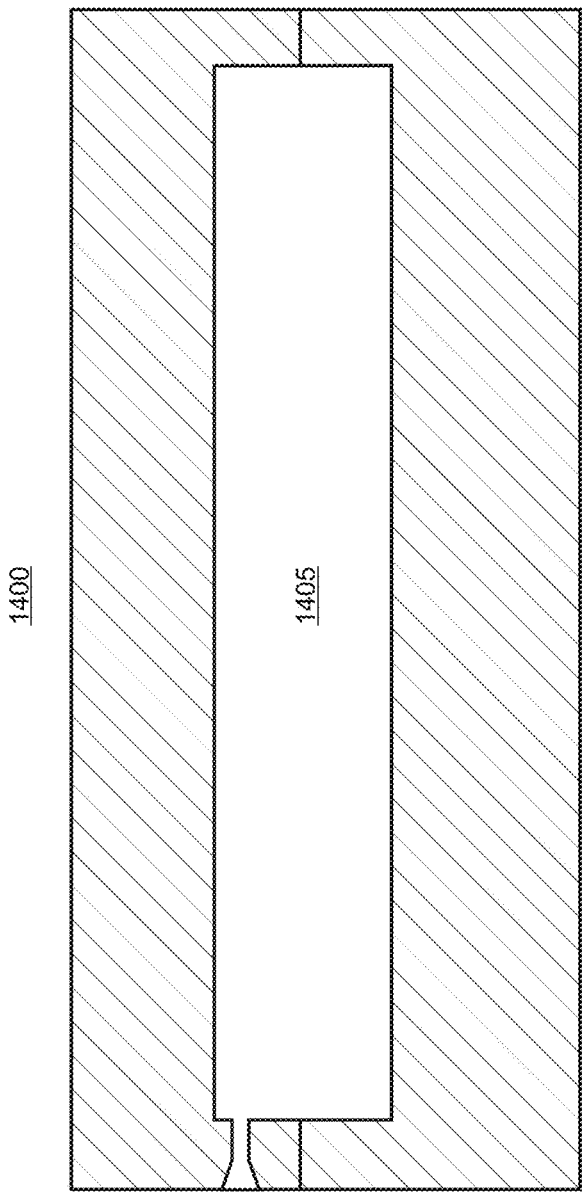
FIG. 14 is a cross-sectional view of an illustrative second injection mold usable in a thermoplastic injection molding process as a step in the present manufacturing of a plastic reflective waveguide.

FIG. 14 is a cross-sectional view of an illustrative second injection mold 1400 having a cavity 1405 usable in a thermoplastic injection molding process as another step in the present manufacturing of a plastic reflective waveguide. In an illustrative example, the second injection mold is utilized in a two-shot injection molding process in which the plastic reflective waveguide is produced using two separate injection molding processes with the same mold. Accordingly, the mold is set up to interact with two injection units, runners/gates, and molding processes. Alternative production processes to two-shot molding include overmolding that typically utilizes separate molds for each stage of the thermoplastic injection molding.

Figure 15:
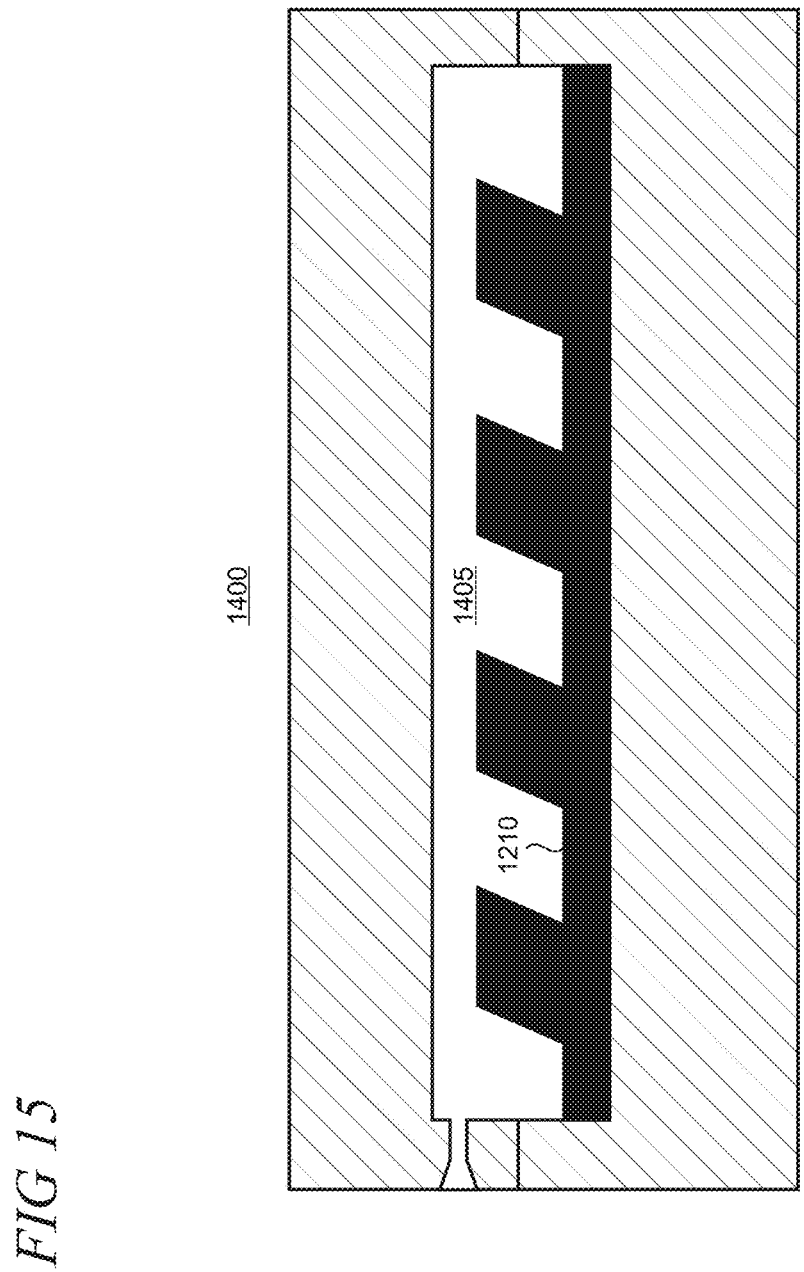
FIG. 15 shows the second injection mold into which the soft transfer stamp is inserted.
Figure 16:
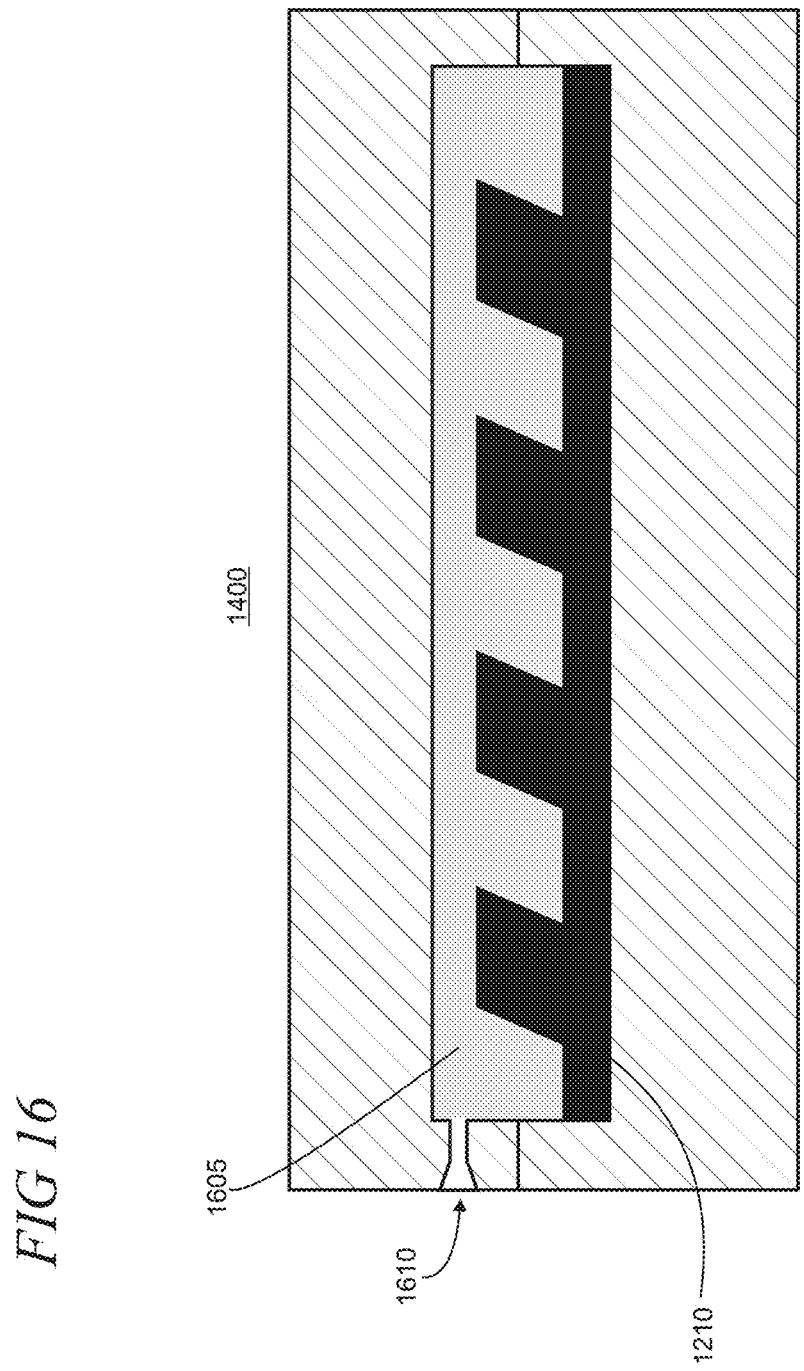
FIG. 16 shows the second injection mold into which the soft transfer stamp is inserted, and thermoplastic is injected to mold a base part of a plastic reflective waveguide.

FIG. 15 shows the second injection mold 1400 into which the soft transfer stamp 1210 is positioned as an insert into the cavity 1405. Optical grade thermoplastic 1605 is injected through a gate 1610 to mold a base part of a plastic reflective waveguide, as shown in FIG. 16. Typically, the optical grade thermoplastic is clear (i.e., optically transparent) to maximize see-through capability of the display system.

Figure 17:
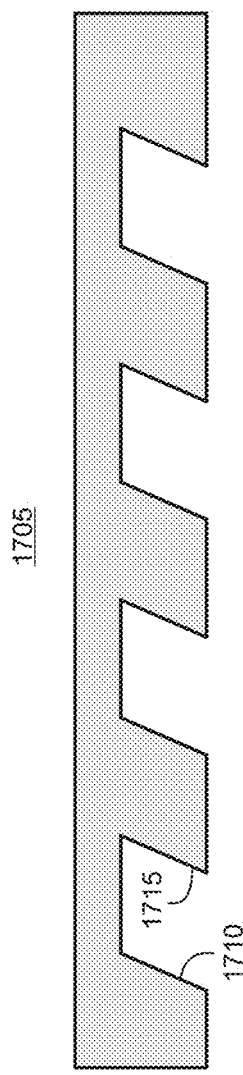
FIG. 17 shows an illustrative base part of the plastic reflective waveguide molded using a thermoplastic injection molding process.
Figure 18:
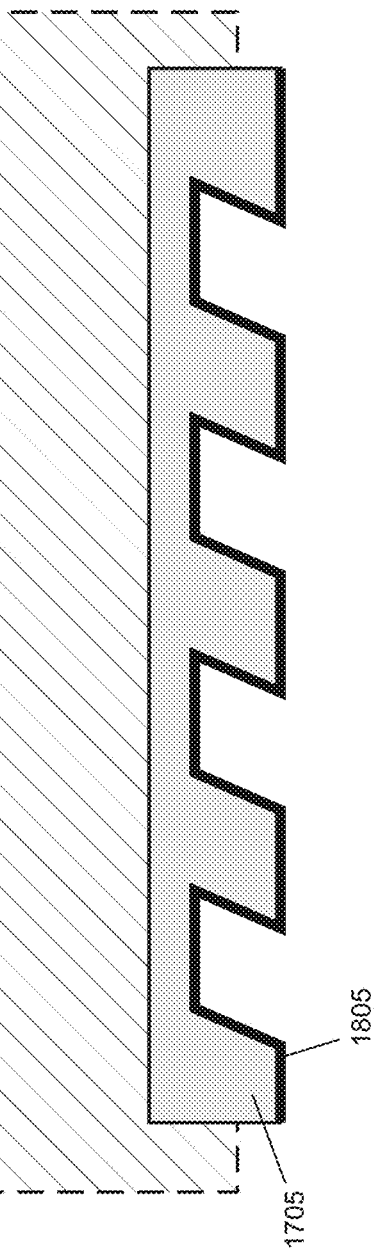
FIG. 18 shows the base part of the plastic reflective waveguide subsequent to application of a partially-reflective coating.

FIG. 17 shows a base part 1705 of the plastic reflective waveguide molded using a thermoplastic injection molding process after the soft transfer stamp is removed. As the soft transfer stamp is molded with parallel walls with a zero degree draft angle, the walls in the base part, representatively indicated by reference numerals 1710 and 1715, maintain a high degree of parallelism. In some applications, for example those that utilize an overmolding process utilizing multiple different molds, the base part is ejected from the second injection mold 1400 (FIG. 14) and subjected to secondary manufacturing processes such as trimming, coating, and/or other suitable finishing processes. In this illustrative example, the base part 1705 is retained in the mold which is configured to open, once the thermoplastic material has cooled and hardened, to enable removal of the soft transfer stamp to thereby expose portions of the part for application of a partially-reflective coating 1805, as shown in FIG. 18.

The partially-reflective coating 1805 typically comprises a thin film coating. Suitable thin film coatings generally comprise various layers of dielectric materials using a similar arrangement and deposition techniques as those described above with reference to FIG. 10 and the accompanying text regarding conventional stacked glass ROEs.

Figure 19:
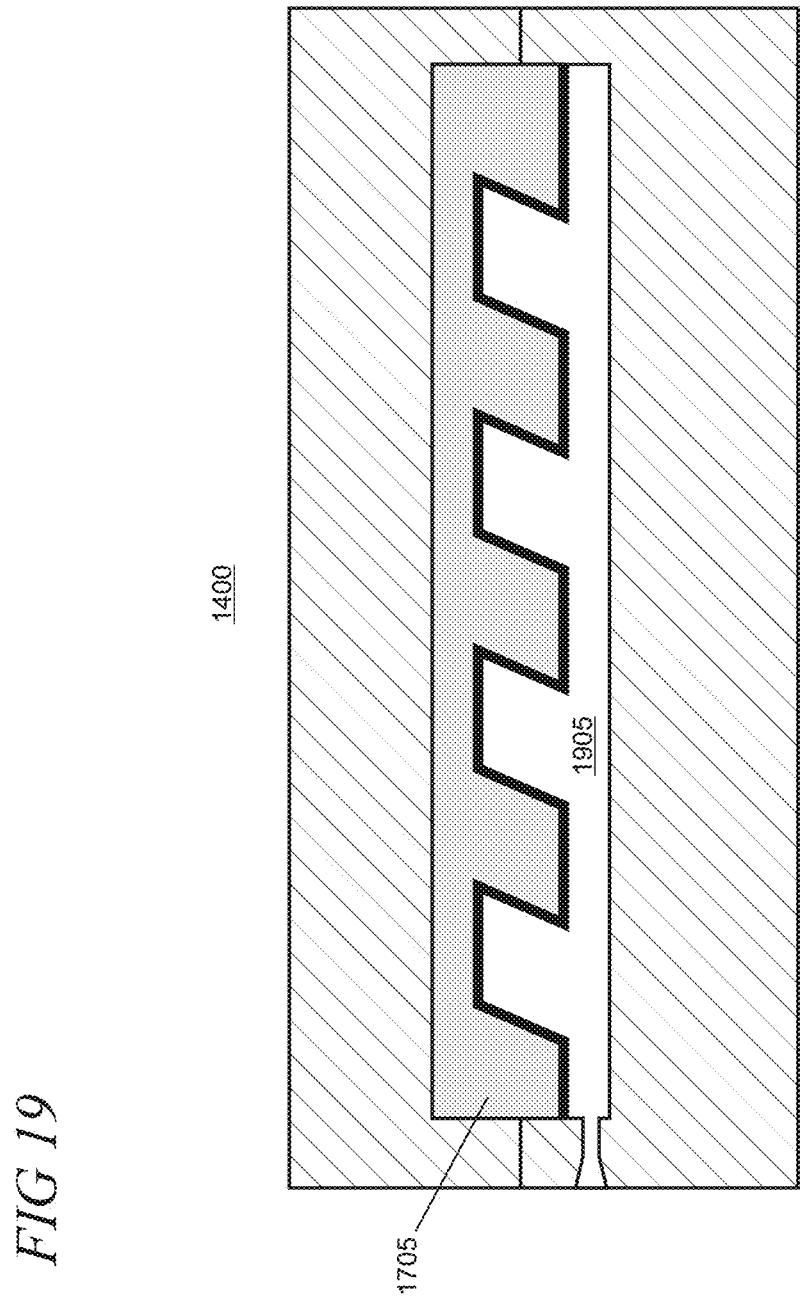
FIG. 19 shows the second injection mold into which the coated base part of the plastic reflective waveguide is located prior to the start of a second thermoplastic injection molding process to mold the secondary part.
Figure 20:
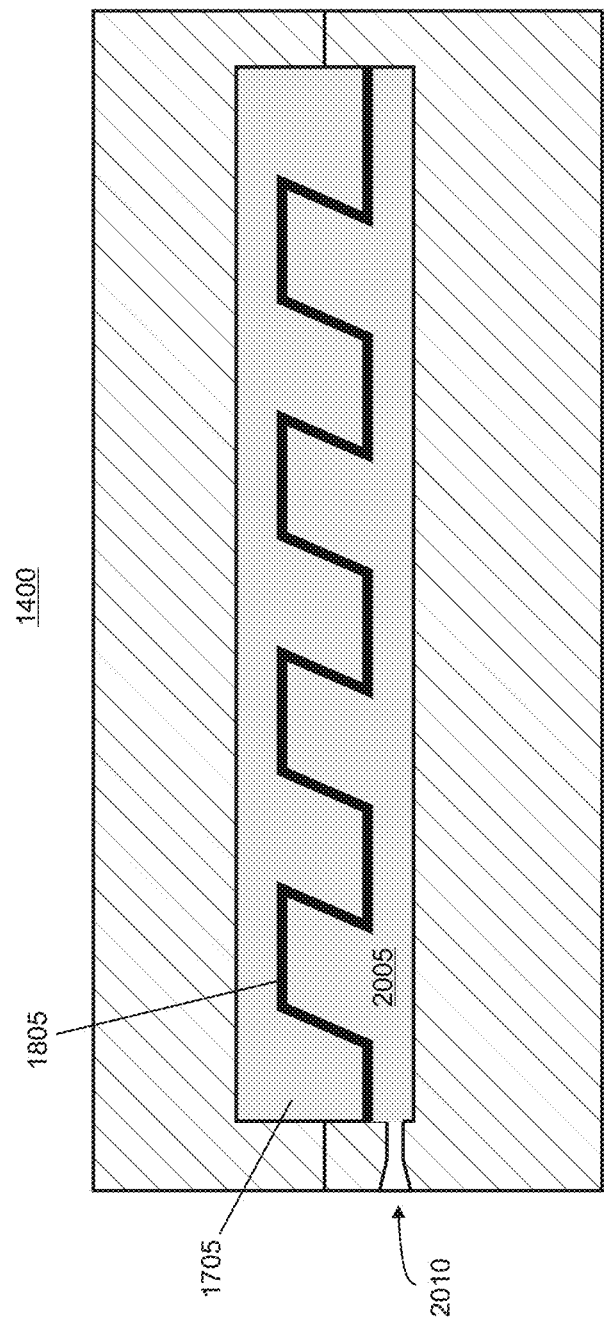
FIG. 20 shows the second injection mold into which thermoplastic is injected to mold a the secondary part of the plastic reflective waveguide.

FIG. 19 shows the second injection mold 1400 into which the coated base part 1705 of the reflective waveguide is located prior to the start of a second thermoplastic injection molding process to mold a secondary part in a second-shot cavity 1905. FIG. 20 shows the second injection mold, in a closed configuration, into which optical grade thermoplastic 2005 is injected through a gate 2010 to mold a secondary part of the reflective waveguide. As noted above, in a two-shot molding process, a separate set of gates and/or runners are typically utilized for each shot of the two-shot process.

Figure 21:
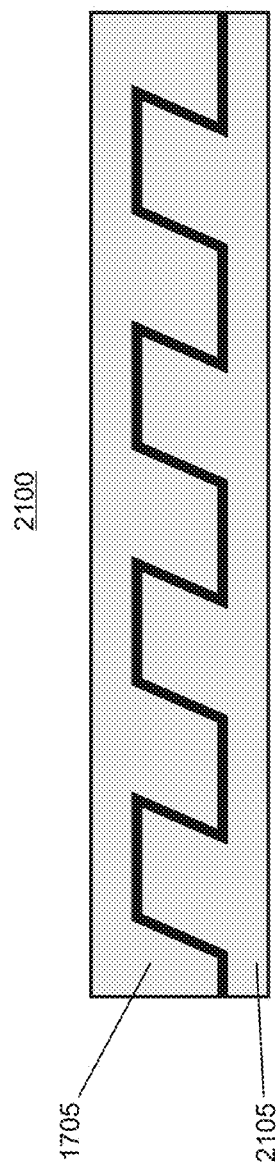
FIG. 21 shows an illustrative raw plastic reflective waveguide as ejected from the second injection mold prior to being subjected to secondary manufacturing processes.

FIG. 21 shows an illustrative raw plastic reflective waveguide 2100 as ejected from the second injection mold prior to being subjected to secondary manufacturing processes. The raw plastic reflective waveguide comprises the base part 1705 and a secondary part 2105. The two parts generally are bonded with a mechanical bond at the interface between the parts, and various structures and details can be added to the molded parts to enhance the mechanical bond such as ribs, divots, protrusions, openings, surface textures, and the like. In addition, the base part can be subjected to additional surface treatments subsequent to the coating process to provide a degree of chemical bonding in some applications.

Figure 22:
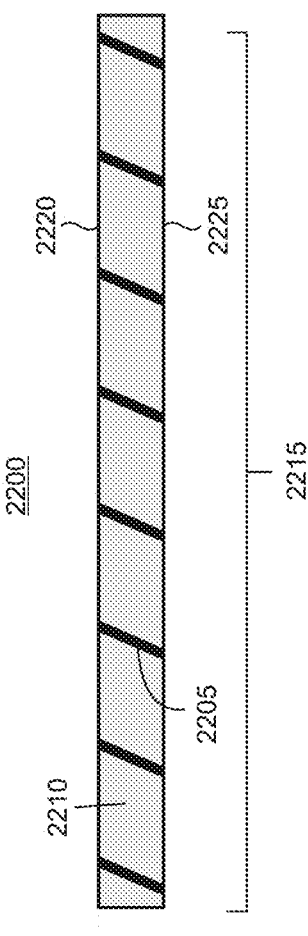
FIG. 22 shows an illustrative finished plastic reflective waveguide after being subjected to secondary manufacturing processes.

FIG. 22 shows an illustrative finished plastic reflective waveguide 2200 after being subjected to secondary fabrication processes. Such processes comprise one or more of cutting, trimming, grinding, polishing, or the like to achieve a final size and form factor for the completed plastic reflective waveguide with desired surface finishes. As shown, the major planar (i.e., broad area) surfaces of the base part and secondary part (i.e., the top and bottom surfaces of the finished plastic reflective waveguide) are parallel to facilitate propagation therein in TIR. The plastic reflective waveguide includes mirror elements, representatively indicated by reference numeral 2205, that are embedded in an optical substrate 2210. The mirror elements are arranged to form a concatenated array 2215, as shown. It may be appreciated that the manufacturing processes described herein are adaptable to position the mirror elements at various locations and angles within the waveguide. In addition, partially embedded and/or fractured mirror architectures are realizable, as discussed in the illustrative examples below.

It may be appreciated that while a plastic reflective waveguide having a substantially planar form factor has been shown in the drawings and described above, thermoplastic injection molding processes and associated molds are flexibly utilized and thus configurable to enable other shapes and form factors to be realizable for the present plastic reflective waveguide. For example, curved waveguides or combinations of planar and curved waveguides are utilizable to meet design and packaging requirements of a given display system or HMD device. Various exemplary form factors for waveguides are described below in the text accompanying FIGS. 23-28.

FIG. 23 is a top view of a first illustrative embodiment of an ROE 2300 implemented using the present plastic reflective waveguide providing a concatenated array 2305 of mirror elements that are embedded in a planar waveguide 2310. The in-coupling ROE 910 is implemented using a prism in this embodiment which in-couples virtual image light from the display engine 405 and imaging optics 415 to the waveguide. The construction and arrangement of mirror elements shown in FIG. 23 are generally applicable to the intermediate ROE 915 (FIG. 9) and/or out-coupling ROE 920 in typical applications.

The individual mirror elements (representatively indicated by reference numeral 2315) are implemented in this illustrative embodiment using thin film coatings to provide partial reflectivity (i.e., beam splitting functionality), as described above. In some implementations the mirror elements are lensed using various lens powers, typically depending on a distance from the display engine. In some implementations, the mirror elements in the array are variable with respect to type and reflectance/transmittance. As shown, the mirror elements are tilted with respect to the x-y plane of the waveguide.

FIG. 24 is a top view of a second illustrative embodiment of an ROE 2400 implemented using the present plastic reflective waveguide providing a concatenated array 2405 of mirror elements that are partially embedded in a planar waveguide 2410. The mirror elements (representatively indicated by reference numeral 2415) are implementable using similar configuration options as with the fully embedded mirror elements in array 2305 (FIG. 23). The partial embedding provides some waveguide combiner (e.g., element 420 in FIG. 4) and/or display system (e.g., element 105 in FIG. 1) design flexibility in some applications, for example, with respect to enhancements to see-through functionality, depth of focus, and/or FOV.

FIG. 25 is a top view of a third illustrative embodiment of an ROE 2500 implemented using the present plastic reflective waveguide providing a concatenated array 2505 of fractured mirror elements that are embedded in a planar waveguide 2510. The fractured mirror elements (representatively indicated by reference numeral 2515) can function as a Fresnel element and/or gain see-through or depth of focus for the waveguide combiner 420 (FIG. 4). Otherwise, the mirror elements are implementable using similar configuration options as with the fully or partially embedded mirror elements described above.

Figure 26:
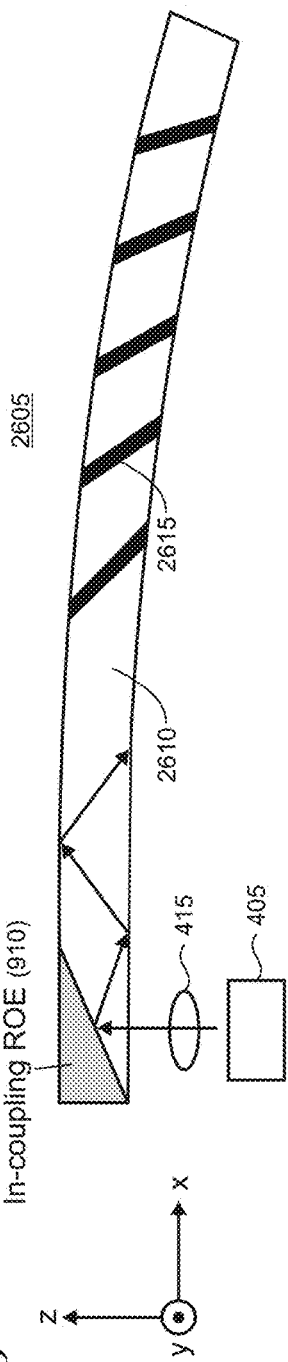

FIG. 26 is a top view of a fourth illustrative embodiment of an ROE 2600 implemented using the present plastic reflective waveguide providing a concatenated array 2605 of mirror elements (representatively indicated by reference numeral 2615) that are embedded in a curved waveguide 2610. The in-coupling ROE 910 is implemented as a prism in this embodiment which in-couples virtual image light from the display engine 405 and imaging optics 415 to the waveguide.

Figure 27:
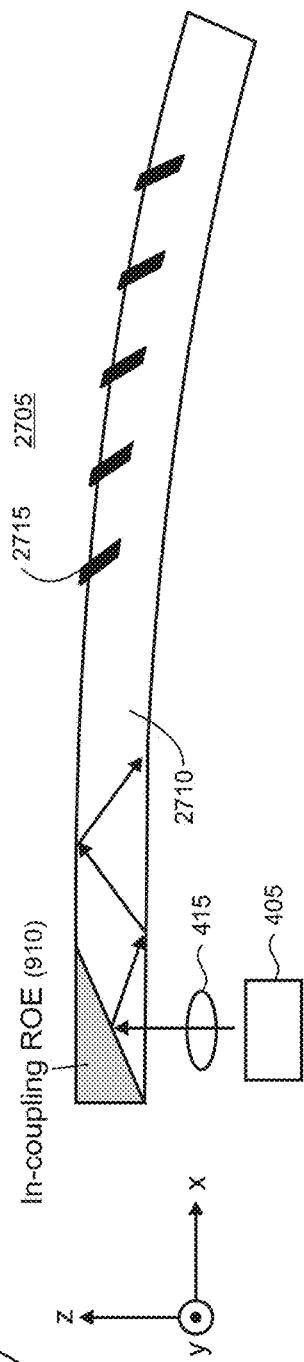

FIG. 27 is a top view of a fifth illustrative embodiment of an ROE 2700 implemented using the present plastic reflective waveguide providing a concatenated array 2705 of mirror elements that are partially embedded in a curved waveguide 2710. The mirror elements (representatively indicated by reference numeral 2715) are implementable using similar configuration options as with the fully embedded mirror elements in array 2605 (FIG. 26). The partial embedding provides some waveguide combiner and/or display system design flexibility in some applications, for example, with respect to enhancements to see-through functionality, depth of focus, and/or FOV.

Figure 28:
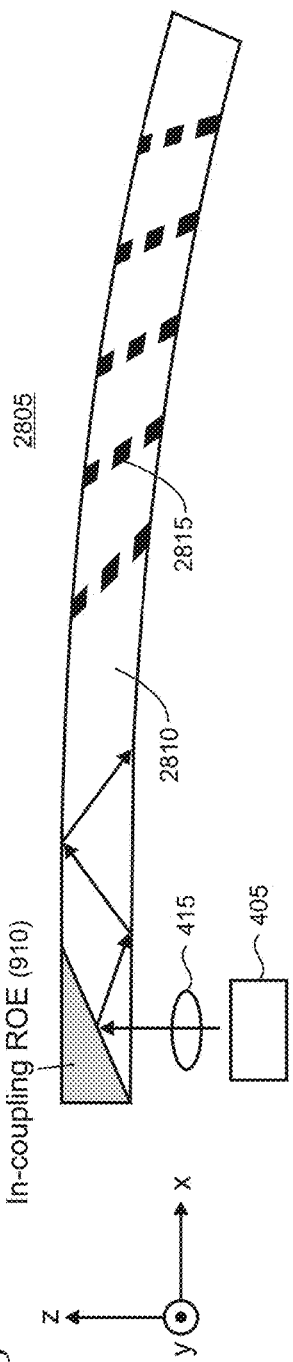

FIG. 28 is a top view of a sixth illustrative embodiment of an ROE 2800 implemented using the present plastic reflective waveguide providing a concatenated array 2805 of fractured mirror elements that are embedded in a curved waveguide 2810. The fractured mirror elements (representatively indicated by reference numeral 2815) can function as a Fresnel element and/or gain see-through or depth of focus for the waveguide combiner. Otherwise, the mirror elements are implementable using similar configuration options as with the fully or partially embedded mirror elements described above.

Figure 29:
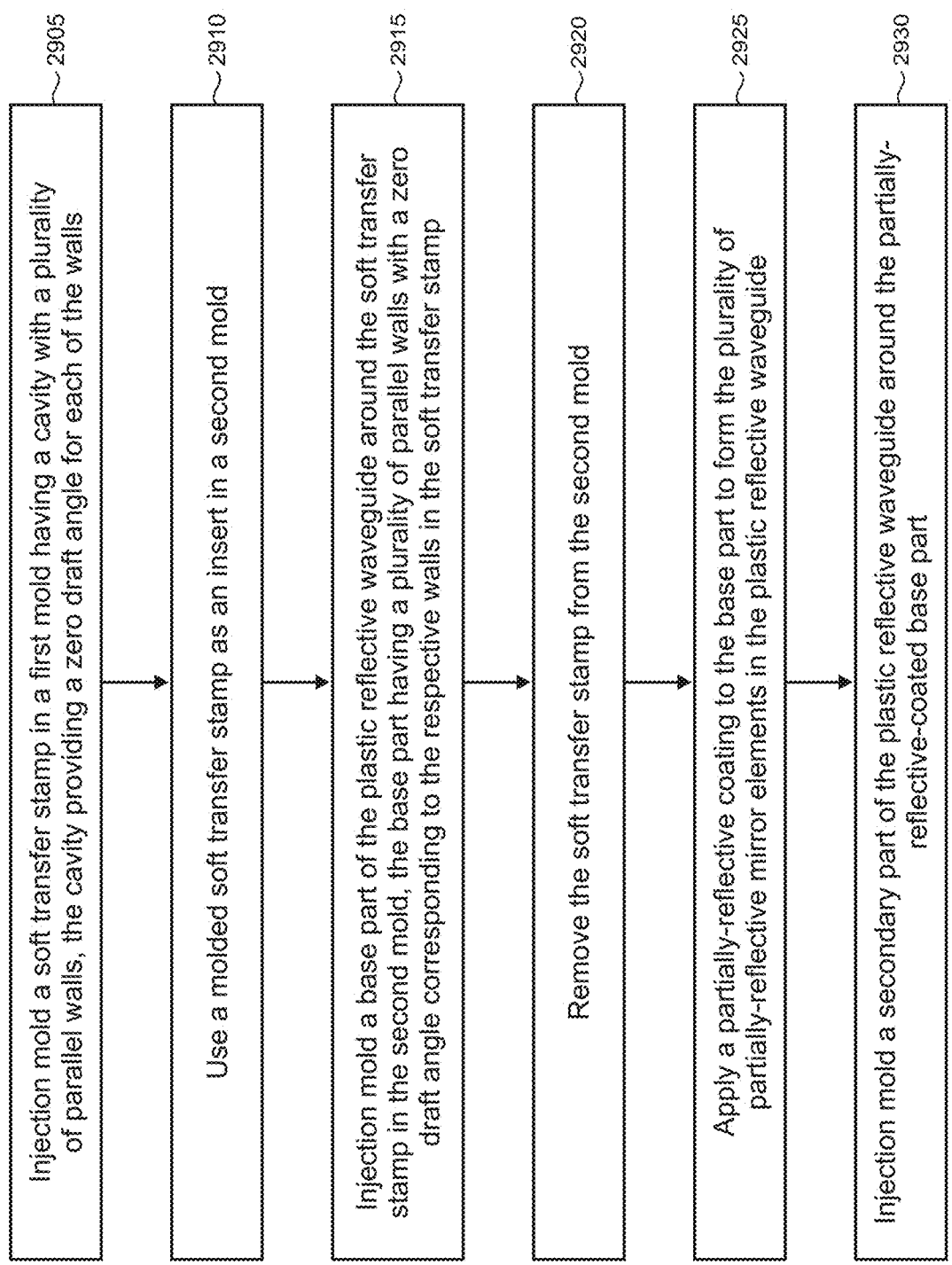
FIG. 29 is a flowchart of an illustrative method for fabricating a waveguide combiner with separate in-coupling and out-coupling plates.

FIG. 29 is a flowchart of an illustrative method 2900 for manufacturing a plastic reflective waveguide having a plurality of partially-reflective mirror elements. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 2905 includes injection molding a soft transfer stamp in a first mold having a cavity with a plurality of parallel walls, the cavity providing a zero draft angle for each of the walls. Block 2910 includes using a molded soft transfer stamp as an insert in a second mold. Block 2915 includes injection molding a base part of the plastic reflective waveguide around the soft transfer stamp in the second mold, the base part having a plurality of parallel walls with a zero draft angle corresponding to the respective walls in the soft transfer stamp.

Block 2920 includes removing the soft transfer stamp from the second mold. Block 2925 includes applying a partially-reflective coating to the base part to form the plurality of partially-reflective mirror elements in the plastic reflective waveguide. Block 2930 includes injection molding a secondary part of the plastic reflective waveguide around the partially-reflective-coated base part.

Figure 30:
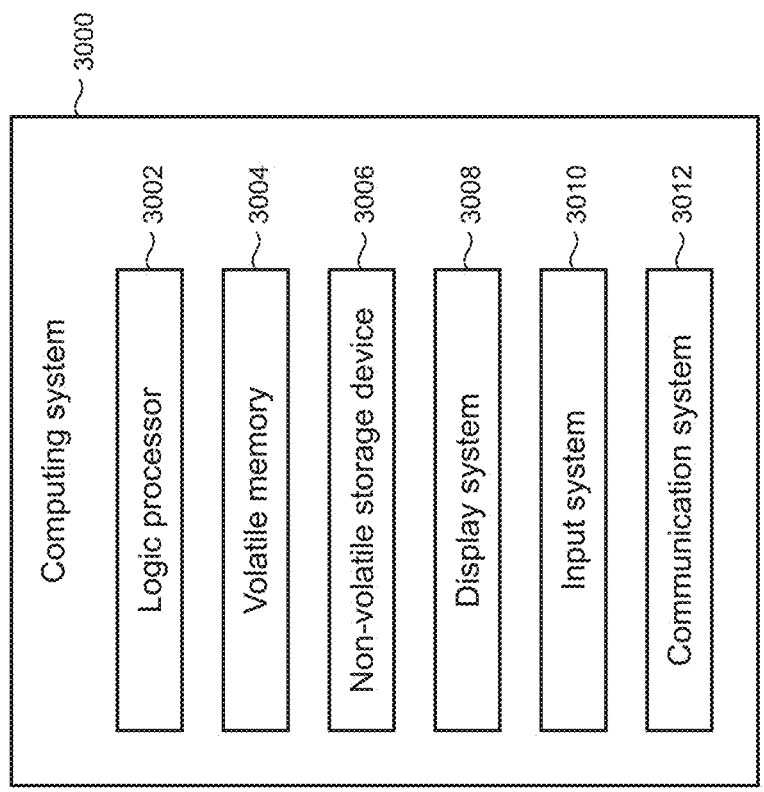
FIG. 30 shows a block diagram of an illustrative electronic device that incorporates a mixed-reality display system using the present plastic reflective waveguide.

FIG. 30 schematically shows an illustrative example of a computing system 3000 that can enact one or more of the systems, features, functions, methods and/or processes described above for the present plastic reflective waveguide manufacturing. The computing system is shown in simplified form. The computing system may take the form of one or more personal computers, server computers, tablet computers, home-entertainment computers, network computing devices, gaming devices, mobile computing devices, mobile communication devices (e.g., smartphone), wearable computers, and/or other computing devices.

The computing system 3000 includes a logic processor 3002, a volatile memory 3004, and a non-volatile storage device 3006. The computing system may optionally include a display system 3008, input system 3010, communication system 3012, and/or other components not shown in FIG. 30.

The logic processor 3002 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 3002 includes one or more processors configured to execute software instructions. In addition, or alternatively, the logic processor includes one or more hardware or firmware logic processors configured to execute hardware or firmware instructions. Processors of the logic processor may be single-core or multi-core, and the instructions executed thereon are configurable for sequential, parallel, and/or distributed processing. Individual components of the logic processor are optionally distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines.

The non-volatile storage device 3006 includes one or more physical devices configured to hold instructions executable by the logic processors to implement the methods and processes described herein. When such methods and processes are implemented, the state of the non-volatile storage device may be transformed—e.g., to hold different data.

The non-volatile storage device 3006 may include physical devices that are removable and/or built-in. Non-volatile storage device may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The non-volatile storage device may include non-volatile, dynamic, static, read/write, read-only, sequential-access, location-addressable, file-addressable, and/or content-addressable devices. It will be appreciated that the non-volatile storage device is configured to hold instructions even when power is cut to the non-volatile storage device.

The volatile memory 3004 may include physical devices that include random access memory. The volatile memory is typically utilized by the logic processor 3002 to temporarily store information during processing of software instructions. It will be appreciated that the volatile memory typically does not continue to store instructions when power is cut to the volatile memory.

Aspects of logic processor 3002, volatile memory 3004, and non-volatile storage device 3006 are capable of integration into one or more hardware-logic components. Such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" is typically used to describe an aspect of computing system 3000 implemented in software by a processor to perform a particular function using portions of volatile memory, which function involves transformative processing that specially configures the processor to perform the function. Thus, a program may be instantiated via the logic processor 3002 executing instructions held by the non-volatile storage device 3006, using portions of the volatile memory 3004. It will be understood that different programs may be instantiated from the same application, service, code block, object, library, routine, API (application programming interface), function, etc. Likewise, the same program may be instantiated by different applications, services, code blocks, objects, routines, APIs, functions, etc. A program may encompass individual or groups of executable files, data files, libraries, drivers, scripts, database records, etc.

When included, the display system 3008 may be used to present a visual representation of data held by the non-volatile storage device 3006. This visual representation may take the form of a graphical user interface (GUI). As the herein described methods and processes change the data held by the non-volatile storage device, and thus transform the state of the non-volatile storage device, the state of the display system 3008 is likewise transformed to visually represent changes in the underlying data. The display system may include one or more display devices utilizing virtually any type of technology; however, one utilizing a MEMS projector to direct laser light may be compatible with the eye-tracking system in a compact manner. Such display devices may be combined with the logic processor 3002, volatile memory 3004, and/or non-volatile storage device 3006 in a shared enclosure, or such display devices may be peripheral display devices.

When included, the input system 3010 may comprise or interface with one or more user-input devices such as a keyboard, mouse, touch screen, or game controller. In some embodiments, the input system may comprise or interface with selected natural user input (NUI) componentry. Such componentry may be integrated or peripheral, and the transduction and/or processing of input actions may be handled on- or off-board. Example NUI componentry includes a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication system 3012 may be configured to communicatively couple various computing devices described herein with each other, and with other devices. The communication system may include wired and/or wireless communication devices compatible with one or more different communication protocols. As non-limiting examples, the communication system may be configured for communication via a wireless telephone network, or a wired or wireless local- or wide-area network. In some embodiments, the communication system may allow computing system 3000 to send and/or receive messages to and/or from other devices via a network such as the Internet.

Various exemplary embodiments of the present plastic reflective waveguide manufacturing are now presented by way of illustration and not as an exhaustive list of all embodiments. An example includes a method for manufacturing a plastic reflective waveguide having a plurality of partially-reflective mirror elements, comprising: injection molding a soft transfer stamp in a first mold having a cavity with a plurality of parallel walls, the cavity providing a zero draft angle for each of the walls; using a molded soft transfer stamp as an insert in a second mold; injection molding a base part of the plastic reflective waveguide around the soft transfer stamp in the second mold, the base part having a plurality of parallel walls with a zero draft angle corresponding to the respective walls in the soft transfer stamp; removing the soft transfer stamp from the second mold; applying a partially-reflective coating to the base part to form the plurality of partially-reflective mirror elements in the plastic reflective waveguide; and injection molding a secondary part of the plastic reflective waveguide around the partially-reflective-coated base part.

In another example, the base part and the secondary part are each molded from optically transparent thermoplastic. In another example, the partially-reflective coating comprises multiple layers of two or more dielectric materials, each of the two or more dielectric materials having a different refractive index. In another example, the dielectric materials comprise one of silicon dioxide (SiO2), titanium dioxide (TiO2), or aluminum oxide (Al2O3). In another example, the injection molding of the soft transfer stamp comprises one of liquid injection molding (LIM), transfer molding, or compression molding. In another example, the injection molding of the soft transfer stamp uses a thermosetting material. In another example, the injection molding of the soft transfer stamp uses silicon. In another example, the injection molding of the base part and the secondary part comprises two-shot injection molding using a single mold to injection mold both the base part and the secondary part. In another example, the injection molding of the base part and the secondary part comprises overmolding using separate molds to injection mold respective ones of the base part and the secondary part. In another example, the method further comprises removing a raw plastic reflective waveguide from the second mold, the raw plastic reflective waveguide comprising the base part and the secondary part. In another example, the method further comprises subjecting the raw plastic reflective waveguide to secondary fabrication processes to produce a finished plastic reflective waveguide. In another example, the secondary fabrication processes include one or more of cutting, trimming, grinding, or polishing. In another example, the partially-reflective coating is applied to the base part using one of chemical deposition or physical deposition. In another example, the soft transfer stamp includes features for increasing mechanical bonding between a molded base part and a molded secondary part. In another example, the features comprise one or more of rib, divot, protrusion, opening, or surface texture. In another example, the cavity of the first mold has a laterally extending base and the plurality of parallel walls are tilted with respect to the laterally extending base. In another example, the first and second molds are each configured for injection molding parts having at least a partially planar shape. In another example, the first and second molds are each configured for injection molding mold parts having at least a partially curved shape.

A further example includes a plastic reflective waveguide in a waveguide combiner employable by a user in a mixed-reality environment that includes views of a real world combined with images of virtual objects from a virtual world, comprising: a base part comprising a plastic see-through waveguide having a plurality of parallel walls, the base part being injection molded using a soft transfer stamp formed from an elastomer such that the plurality of parallel walls have a zero degree draft angle; a cascaded array of partially-reflective mirrors comprising a thin film dielectric coating disposed on the parallel walls of the molded base part; and a secondary part comprising a plastic see-through waveguide that is injection molded over the base part forming a mechanical bond between the base part and the secondary part.

A further example includes a head-mounted display (HMD) device wearable by a user and supporting a mixed-reality experience comprising a display of virtual images for objects in a virtual world and views of a real world, comprising: a display engine producing light for the virtual images; and an optical system receiving the virtual images from the display engine with an entrance pupil, the optical system comprising a see-through waveguide combiner, the see-through waveguide combiner displaying the virtual images to the HMD device user that are superimposed over views by the user of the real world, wherein the see-through waveguide combiner comprises at least one plastic reflective waveguide having a plurality of partially-reflective mirrors embedded therein, the plurality of partially-reflective mirrors configured for providing an exit pupil for the virtual images from the see-through waveguide combiner that is expanded relative to the entrance pupil, and wherein the plastic reflective waveguide includes a base part having a plurality of parallel walls on which a partially-reflective thin film dielectric coating is disposed to form the plurality of partially-reflective mirrors, the plurality of parallel walls being injection molded using a soft transfer stamp to provide a zero degree draft angle for each of the parallel walls, and wherein the plastic reflective waveguide includes a secondary part that is injection molded over the base part, the base part and secondary part being configured with parallel broad area surfaces to support propagation by total internal reflection of the virtual image light within the plastic reflective waveguide.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for manufacturing a plastic reflective waveguide having a plurality of partially-reflective mirror elements, comprising:
   injection molding a soft transfer stamp in a first mold having a cavity with a plurality of parallel walls, the cavity providing a zero draft angle for each of the walls;
   using a molded soft transfer stamp as an insert in a second mold;
   injection molding a base part of the plastic reflective waveguide around the soft transfer stamp in the second mold, the base part having a plurality of parallel walls with a zero draft angle corresponding to the respective walls in the soft transfer stamp;
   removing the soft transfer stamp from the second mold;
   applying a partially-reflective coating to the base part to form the plurality of partially-reflective mirror elements in the plastic reflective waveguide; and
   injection molding a secondary part of the plastic reflective waveguide around the partially-reflective-coated base part.

2. The method of claim 1 in which the base part and the secondary part are each molded from optically transparent thermoplastic.

3. The method of claim 1 in which the partially-reflective coating comprises multiple layers of two or more dielectric materials, each of the two or more dielectric materials having a different refractive index.

4. The method of claim 3 in which the dielectric materials comprise one of silicon dioxide (SiO2), titanium dioxide (TiO2), or aluminum oxide (Al2O3).

5. The method of claim 1 in which the injection molding of the soft transfer stamp comprises one of liquid injection molding (LIM), transfer molding, or compression molding.

6. The method of claim 1 in which the injection molding of the soft transfer stamp uses a thermosetting material.

7. The method of claim 1 in which the injection molding of the soft transfer stamp uses silicon.

8. The method of claim 1 in which the injection molding of the base part and the secondary part comprises two-shot injection molding using a single mold to injection mold both the base part and the secondary part.

9. The method of claim 1 in which the injection molding of the base part and the secondary part comprises overmolding using separate molds to injection mold respective ones of the base part and the secondary part.

10. The method of claim 1 further comprising removing a raw plastic reflective waveguide from the second mold, the raw plastic reflective waveguide comprising the base part and the secondary part.

11. The method of claim 10 further comprising subjecting the raw plastic reflective waveguide to secondary fabrication processes to produce a finished plastic reflective waveguide.

12. The method of claim 11 in which the secondary fabrication processes include one or more of cutting, trimming, grinding, or polishing.

13. The method of claim 1 in which the partially-reflective coating is applied to the base part using one of chemical deposition or physical deposition.

14. The method of claim 1 in which the soft transfer stamp includes features for increasing mechanical bonding between a molded base part and a molded secondary part.

15. The method of claim 14 in which the features comprise one or more of rib, divot, protrusion, opening, or surface texture.

16. The method of claim 1 in which the cavity of the first mold has a laterally extending base and the plurality of parallel walls are tilted with respect to the laterally extending base.

17. The method of claim 1 in which the first and second molds are each configured for injection molding parts having at least a partially planar shape.

18. The method of claim 1 in which the first and second molds are each configured for injection molding mold parts having at least a partially curved shape.

* * * * *